US012342952B2

(12) United States Patent
Shieldkret et al.

(10) Patent No.: US 12,342,952 B2
(45) Date of Patent: Jul. 1, 2025

(54) TREE TOPPER STABILIZER

(71) Applicant: JSJ Design Company LLC, Longview, TX (US)

(72) Inventors: Jennifer Shieldkret, Maple Valley, WA (US); Judith McWilliams, Longview, TX (US); Suzanne Tillmond, Normandy, MO (US)

(73) Assignee: JSJ Design Company LLC, Longview, TX (US)

( * ) Notice: Subject to any disclaimer, the term of this patent is extended or adjusted under 35 U.S.C. 154(b) by 0 days.

(21) Appl. No.: 18/932,817

(22) Filed: Oct. 31, 2024

(65) Prior Publication Data

US 2025/0143500 A1 May 8, 2025

Related U.S. Application Data

(60) Provisional application No. 63/547,206, filed on Nov. 3, 2023.

(51) Int. Cl.
| | |
|---|---|
| *A47G 33/10* | (2006.01) |
| *A47G 33/08* | (2006.01) |
| *F16B 2/00* | (2006.01) |
| *F16B 2/06* | (2006.01) |
| *F16B 7/02* | (2006.01) |

(52) U.S. Cl.
CPC ............. *A47G 33/10* (2013.01); *A47G 33/08* (2013.01); *F16B 2/00* (2013.01); *F16B 2/065* (2013.01); *F16B 7/02* (2013.01); *A47G 2033/089* (2013.01)

(58) Field of Classification Search
CPC ...... A47G 33/10; A47G 33/08; A47G 33/089; A47G 33/105; A47G 2033/089; F16B 2/00; F16B 2/065; F16B 7/02
See application file for complete search history.

(56) References Cited

U.S. PATENT DOCUMENTS

| | | | | |
|---|---|---|---|---|
| 5,071,098 | A  * | 12/1991 | Aldridge | A47F 5/04 |
| | | | | 248/219.2 |
| 8,801,227 | B1 * | 8/2014 | Loomis | F21V 21/32 |
| | | | | 362/396 |
| 9,211,026 | B1 * | 12/2015 | McLemore | A47G 33/10 |

(Continued)

FOREIGN PATENT DOCUMENTS

CA          2305109 A1 * 10/2001 ............. A47G 33/10

*Primary Examiner* — Eret C McNichols
(74) *Attorney, Agent, or Firm* — H. Brock Kolls

(57) ABSTRACT

The tree topper stabilizer secures various types and sizes of ornaments to a tree by providing a stable, adjustable platform. It comprises a threaded mounting adapter, an attachment adapter, one or more rod mounts, at least two threaded tabs with gripper leg connectors, and a collar. The gripper legs interlock with the connectors, and the collar tightens around the threaded tabs, causing them to flex inward, securing the gripper legs against the branches. The stabilizer supports ornaments using rods, hooks, or cone attachments, including hollow ornaments that are secured by flexible cone tabs that adjust to various sizes. The attachment adapter is adjustable, enabling different ornament orientations. The stabilizer may include a base, gripping prongs on the collar for improved tightening, and spikes on the gripper legs for added stability. It is suitable for both natural and artificial trees, ensuring secure placement of decorations during display.

20 Claims, 18 Drawing Sheets

(56) References Cited

U.S. PATENT DOCUMENTS

| | | | | |
|---|---|---|---|---|
| 12,226,038 B2* | 2/2025 | Wicken | ............... | A47G 33/08 |
| 12,233,351 B2* | 2/2025 | Shieldkret | ............. | A63H 3/008 |
| 2010/0096526 A1* | 4/2010 | Richardson | ........... | A47G 33/10 |
| | | | | 248/231.81 |
| 2012/0040110 A1* | 2/2012 | Harman, II | ........... | A47G 33/10 |
| | | | | 29/525.02 |
| 2016/0331172 A1* | 11/2016 | Bauer | ................... | A47G 33/08 |
| 2017/0295981 A1* | 10/2017 | Hendricks | .............. | A47G 33/10 |
| 2021/0315405 A1* | 10/2021 | Lin | ..................... | F16M 13/022 |
| 2022/0104648 A1* | 4/2022 | Zhao | .................... | A47G 33/10 |
| 2023/0172380 A1* | 6/2023 | Hendricks | .............. | A47G 33/08 |
| | | | | 248/205.1 |

* cited by examiner

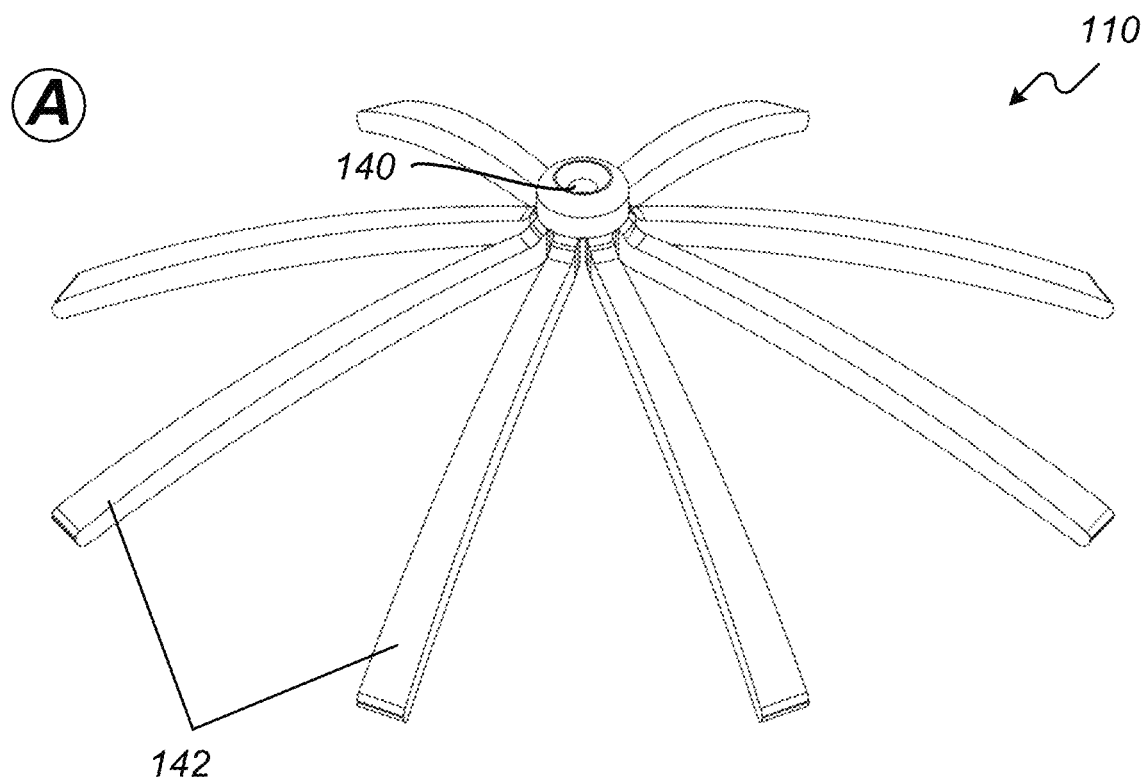
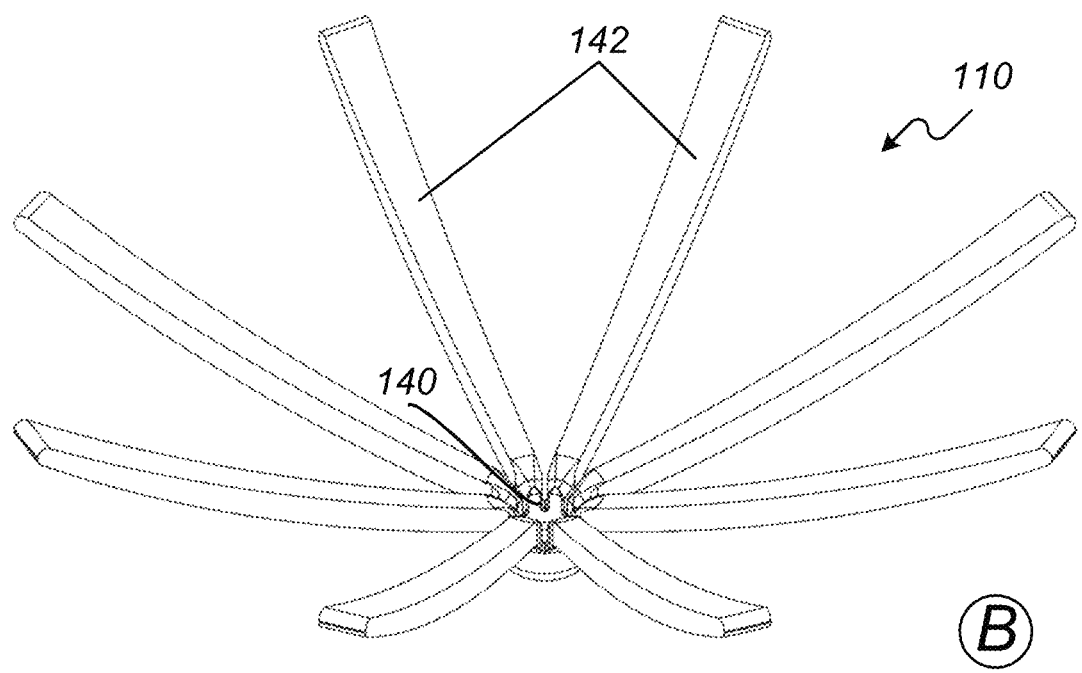
Fig. 14

TREE TOPPER STABILIZER

CROSS-REFERENCE TO RELATED TREATMENTS

This application contains subject matter which is related to the subject matter of the following co-pending application. The below-listed application is hereby incorporated herein by reference in their entirety:

This U.S. non-provisional application claims the benefits of a U.S. provisional application, Ser. No. 63/547,206, inventor Jennifer Shieldkret et al., entitled "TREE TOPPER STABILIZER", filed Nov. 3, 2023.

TECHNICAL FIELD OF THE INVENTION

The present invention relates to a tree topper stabilizer, specifically designed to secure various types and sizes of ornaments at the top of a tree. The invention addresses the challenges of stabilizing ornaments, particularly large or hollow ones, by providing a robust, adjustable attachment mechanism, base, or other suitable platforms. It includes mechanisms for attaching and securing ornaments using various attachment adapters, such as rods, hooks, and cones, while ensuring stability through gripping components that engage with the branches of both natural and artificial trees.

BACKGROUND OF THE INVENTION

Before our invention, placing large, heavy, or irregularly shaped ornaments at the top of a tree presented significant challenges. Many individuals relied on basic methods, such as resting the ornament directly on branches or using thin wire, string, or adhesive hooks. These methods were inadequate for several reasons. Resting ornaments on branches without a secure attachment often led to instability, causing the ornament to tilt or fall, particularly with larger or heavier ornaments. Using wire or string could provide some additional support, but it often resulted in awkward, uneven positioning, and in some cases, could even damage the decorations, ornaments, or delicate branches of the tree.

Another significant shortcoming of prior methods is the risk that unstable ornaments may fall and break. Many ornaments, particularly those used during family holiday traditions, carry significant sentimental value and are often associated with cherished family memories. When these ornaments break, the loss can be emotionally distressing, in addition to being financially costly, as certain ornaments may be rare or irreplaceable.

In addition, prior approaches were not adaptable to the wide variety of ornament types and sizes, especially for hollow ornaments, which require a more secure and stable base to prevent them from shifting or falling. Existing devices lacked options for customization, relying on fixed positions that did not account for the differing weights, shapes, and sizes of modern ornamental designs. Moreover, these prior methods rarely offered solutions for gripping the branches of a tree securely, which made it difficult to accommodate variations in branch thickness and strength, whether in natural or artificial trees.

Attempts to improve the situation included rigid devices that provided a single point of attachment, but these efforts failed to address the fundamental issue of creating a stable, multi-point grip on the tree branches. Without sufficient flexibility or the ability to accommodate ornaments of varying dimensions, these devices fell short of providing the stability required, particularly at the top of the tree, where branches are often thinner and more fragile.

The present invention addresses these and other shortcomings by providing a tree topper stabilizer to secure ornaments to the top of a tree. For these reasons and shortcomings, as well as other reasons and shortcomings, there is a long-felt need that gives rise to the present invention.

SUMMARY OF THE INVENTION

The shortcomings of the prior art are overcome and additional advantages are provided through the provision of a tree topper stabilizer for securing an ornament to a tree. This stabilizer comprises a threaded mounting adapter, which includes an attachment adapter for connecting various ornament types, one or more rod mounts, and at least two threaded tabs, each configured with a gripper leg connector. The gripper legs interlock with the gripper leg connectors, and a collar with internal threading is used to tighten around the threaded tabs. As the collar tightens, it causes the threaded tabs to flex inward, effectively squeezing and securing the gripper legs against the branches of the tree. This design creates a multi-point stabilization system that prevents the ornament from tilting, slipping, or falling, addressing the limitations of single-point attachments in prior art. The adjustable attachment adapter further allows for the accommodation of different sizes and types of ornaments, making the stabilizer versatile for a wide range of decorative items. The stabilizer also provides additional benefits by preventing damage to delicate branches and ensuring that even heavy or irregularly shaped ornaments remain securely in place during use.

Additional shortcomings of the prior art are overcome and additional advantages are provided through the provision of a tree topper stabilizer that is specifically designed for use with both natural and artificial trees. This stabilizer includes a threaded mounting adapter with a rod mount and at least two gripper legs that interconnect with the threaded tabs of the adapter. A removable rod extends upward from the base, allowing for the secure placement of various ornaments, including large or heavy decorations that previously posed challenges for stability. The stabilizer also features a cone attachment with flexible cone tabs, which can adapt to secure both small and large hollow ornaments. These flexible tabs allow the stabilizer to accommodate ornaments with varying interior diameters, providing a secure grip even for ornaments that lack a firm internal structure. The collar tightens around the threaded tabs, causing them to flex inward, which in turn squeezes the gripper legs against the tree branches, securing the stabilizer in place. This flexible design allows for versatility in ornament selection and placement, while ensuring stability even on thin or delicate branches. The combination of adaptable attachments and secure gripping mechanisms ensure that ornaments stay in place and remain properly positioned, solving the instability and falling issues common in prior methods.

Additional shortcomings of the prior art are overcome and additional advantages are provided through the provision of a method for securing an ornament to a tree using a tree topper stabilizer. The method involves several key steps designed to ensure stability and ease of use. First, the threaded mounting adapter of the stabilizer is positioned on top of the tree. The method then includes connecting at least two gripper legs with the threaded tabs of the mounting adapter and inserting the gripper legs downward through the tree branches. Once the gripper legs are in place, the collar is tightened around the threaded mounting adapter, causing the threaded tabs to flex inward. This action presses the gripper legs securely against the branches, ensuring that the stabilizer remains firmly attached to the tree. The method further includes attaching an ornament to the stabilizer via the attachment adapter, rod, hook, or cone attachment, depending on the type and size of the ornament. This flexible attachment system allows for the secure placement of various ornaments, including those that are hollow, heavy, or irregularly shaped. The method ensures that ornaments remain upright and balanced, addressing the issue of unstable ornaments that often tilt or fall when using prior art methods. By offering a reliable, multi-point stabilization system, this method improves the overall display of ornaments and reduces the risk of damage due to falling ornaments.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 13-14 illustrates one example of a cone attachment;

The detailed description explains the preferred embodiments of the invention, together with advantages and features, by way of example with reference to the drawings.

DETAILED DESCRIPTION OF THE INVENTION

Figure 1:
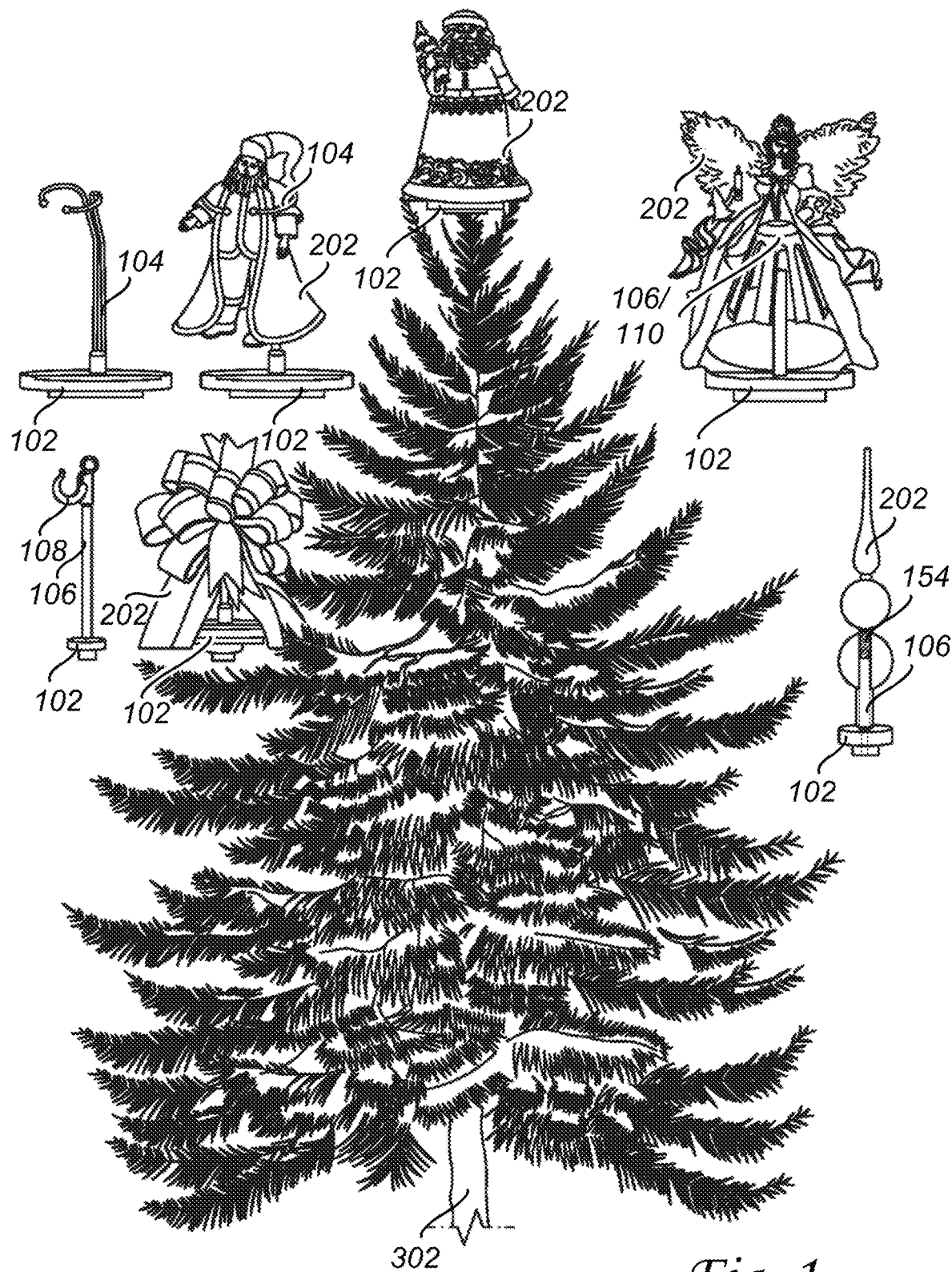
FIG. 1 illustrates one example of a tree topper stabilizer with a plurality of attachments.

Turning now to the drawings in greater detail, it will be seen that in FIG. 1 there is illustrated one example of a tree topper stabilizer 100 with a plurality of attachments. In an exemplary embodiment, the tree topper stabilizer 100 comprises a base 102 and a threaded mounting adapter 150 that fastens to the base 102. The threaded mounting adapter 150 comprises more than one threaded tab 136, more than one gripper leg connector 134 formed on the end of the threaded tab 136, and an attachment adapter 112 that extends through the mounting adapter hole 152 and is accessible on the surface of the base 102.

The unique threaded mounting adapter 150 of the tree topper stabilizer introduces new possibilities for ornament design and versatility, significantly broadening the range of tree toppers available to consumers. By providing a stable, adaptable mounting hub at the base, the threaded mounting adapter enables the secure attachment of a wide variety of ornaments, including elaborate and innovative designs that were previously challenging to stabilize. This new configuration allows for more complex and heavier decorations, expanding the creative limits for tree toppers. Designers and manufacturers can now create larger, more intricate tree toppers that remain firmly in place, transforming the market for holiday decorations and offering consumers a greater selection of visually impressive and structurally sound options. The stabilizer's flexible support structure encourages the development of diverse designs, making it ideal for both traditional and modern decorative styles.

In practical applications, the tree topper stabilizer performs effectively with both natural and artificial trees, though specific adjustments may be beneficial when used on natural trees with less dense upper branches. In some cases, when attaching particularly heavy or elaborate toppers to natural trees, it may be necessary to trim the top section of the tree down to a denser portion for improved stability. Additionally, a strap or similar securing mechanism can be applied around the stabilizer's prongs to further enhance stability. Traditional or lighter toppers generally achieve adequate stability without these adjustments. Artificial trees typically present fewer stability issues, as they are often designed with dense branches throughout, providing an inherently secure base for the stabilizer and its supported ornament. These adaptability options make the tree topper stabilizer versatile across a variety of tree types and ornament weights.

In the present invention, the term "ornaments" is intended to mean any decorative object or embellishment designed to be displayed on a tree, including but not limited to traditional holiday decorations, figurines, symbols, lights, garlands, and custom decorative pieces. Ornaments may vary widely in size, shape, weight, and style, and can include items made of materials such as glass, metal, plastic, wood, or fabric. The term encompasses both lightweight and heavy ornaments, including elaborate and intricate designs, whether used for seasonal displays, themed events, or year-round decorative purposes. This broad definition allows the tree topper stabilizer to accommodate a diverse range of decorative items, providing a secure and adaptable display platform for all types of ornaments.

In another exemplary embodiment, the tree topper stabilizer 100 may be designed to support larger and heavier ornaments by incorporating reinforced components. For instance, the base 102 may be constructed using reinforced materials, such as high-strength metal alloys or impact-resistant composites, to provide additional structural support. The rod 106 may also be available in a thicker, heavy-duty version to accommodate the weight of oversized ornaments while preventing sagging or instability. These reinforced components allow the tree topper stabilizer 100 to be used in public displays or commercial environments where larger, intricate decorations are commonly employed. This heavy-duty configuration ensures that even the heaviest ornaments remain securely positioned atop the tree.

In operation, the tree topper stabilizer 100 can be secured to the top of tree 302 such that base 102 is accessible. Ornaments 202 can then be secured on the base 102. Such ornaments 102 can include bows, angels, Santa, fancy ornaments, and numerous other ornaments as may be required and/or desired in a particular embodiment.

To accommodate different kinds of ornaments 202 different attachments to the base 102 can be used. In this regard, in an exemplary embodiment, rod 106 can be fastened to the base and ornaments can be hung or otherwise secured to the rod. In another exemplary embodiment, a hook 108 can be used in combination with a rod 106 and ornaments can be hung or otherwise secured to the hook. In another exemplary embodiment, a small mounting cone 154 can be attached to a rod 106 and an ornament can be secured on top of the mounting cone 154. In another exemplary embodiment, a cone 110 can be attached to a rod 106 and an ornament can be secured on top of the cone 110. In general, mounting cone 154 can be used with small-diameter ornaments, and cone 110 has flexible cone tabs 142 making it suitable for use with large-diameter ornaments that have hollow interiors such as many of the angels and other such ornaments.

In an exemplary embodiment, hook 108 can be attached to the free end of rod 106. In operation, ornament 202 can be attached or otherwise displayed on hook 108.

In an exemplary embodiment, a mounting cone 154 can be attached to the free end of rod 106. In operation, ornament 202 can be placed over the mounting cone 154 for display.

Figure 13:
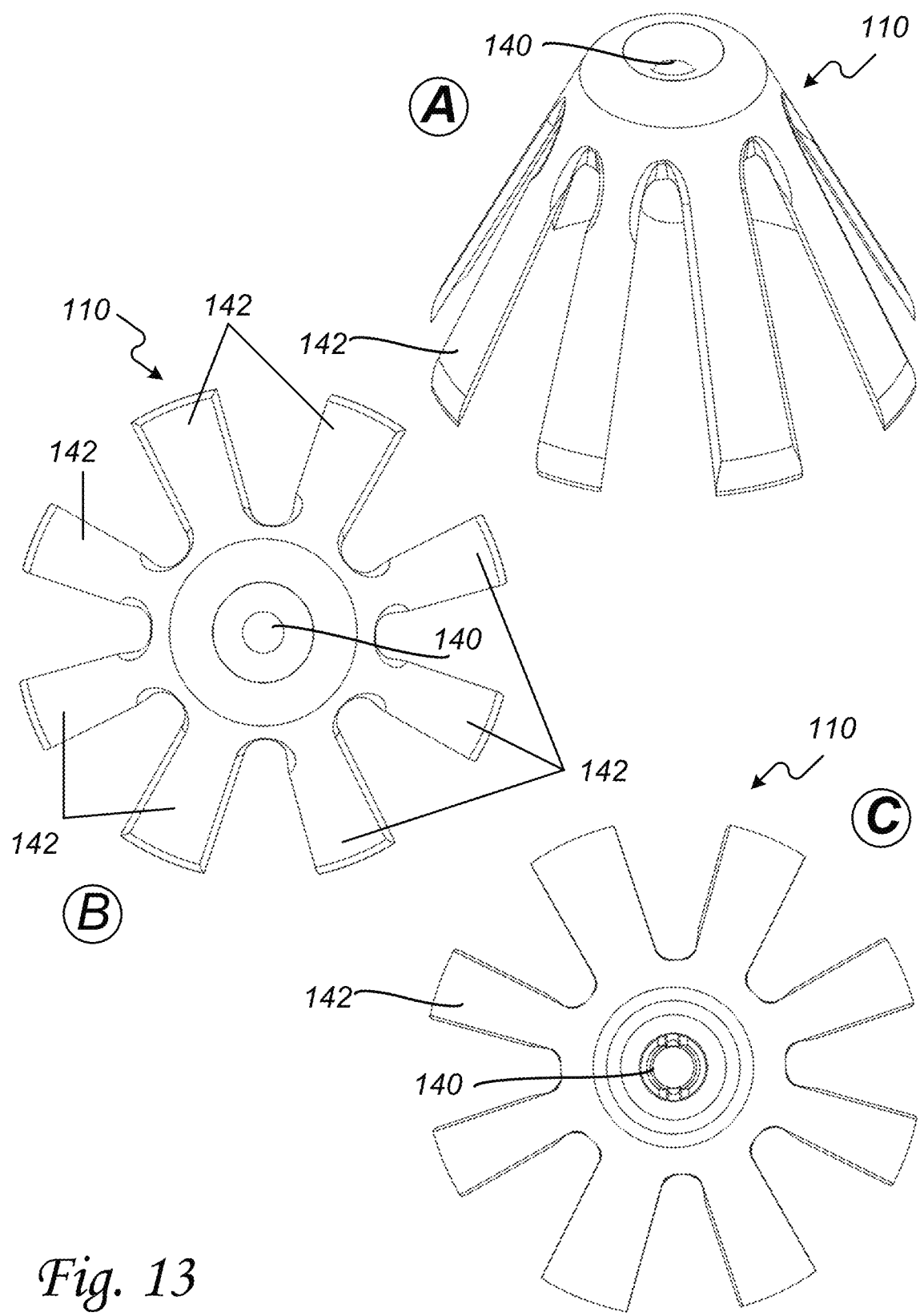

In an exemplary embodiment and with reference to FIG. 13, cone 110 can be attached to the free end of rod 106. Cone 106 can comprise more than one cone tab 142 that together form the cone shape. In operation, ornament 202 can be placed over cone 110 or otherwise displayed.

In an exemplary embodiment, wire rod 104 can be removably fastened to rod mount 114. Wire rod 104 extends upward from base 102, In operation, ornament 202 can be gripped by wire rod 104 or otherwise displayed.

In another embodiment, the tree topper stabilizer 100 can accommodate different sizes of bases, allowing for increased flexibility in ornament display. For smaller, lighter ornaments, a smaller base 102 can be used, providing a compact and subtle support platform that is well-suited for ornaments weighing less than 5 pounds. Alternatively, for larger and heavier ornaments, a larger base 172 can be used. This larger base 172 provides greater stability and support for ornaments weighing up to 15 pounds. The ability to interchange these bases allows users to select the most appropriate configuration for their specific ornament size and weight, ensuring a secure and stable display for a wide range of decorative items.

The flexibility in base sizes not only allows for a variety of ornament weights and types but also improves the overall market utility of the tree topper stabilizer 100. In one exemplary embodiment, the larger base 172 can be designed with reinforced materials to support heavy or oversized ornaments, providing a sturdy platform that resists tilting or movement. In another exemplary embodiment, bases can be custom-designed for specific weight capacities beyond 15 pounds, as may be required or desired in a particular setting. Whether used for lightweight decorations or heavier ornamental displays, the interchangeable bases enhance the versatility of the tree topper stabilizer 100.

In another embodiment, the tree topper stabilizer is adapted for use with tabletop trees, providing a compact and versatile option for smaller decorative displays. This smaller version of the stabilizer is scaled down to fit the reduced dimensions of tabletop trees, enabling the secure mounting of miniaturized toppers and ornaments that are appropriately sized for these smaller setups. By accommodating lighter, smaller toppers, this variation allows for the same stability and versatility as the full-sized stabilizer, extending the functionality of the invention to a broader range of decorative tree sizes. This adaptation opens new possibilities for holiday and event decorations on tabletops, counters, and other limited-space displays, offering users a stable and secure option for enhancing compact tree setups.

In operation, this versatility allows the tree topper stabilizer 100 to securely display ornaments ranging from lightweight holiday stars to larger, heavier decorative pieces such as intricate figurines. The stabilizer is configured to handle the forces exerted by the branches of the tree 302 while ensuring that the ornament remains upright and securely fastened. The range of bases ensures that the stabilizer can be used for both indoor and outdoor displays, offering a reliable and adaptable solution for ornament stabilization in various environments.

In some market variations, the tree topper stabilizer 100 may be offered with customizable aesthetic features to complement different decor themes. For example, the rod 106 and cone 110 may be available in various decorative finishes, such as metallic gold, silver, or custom holiday-themed colors. The rod 106 may also be topped with ornamental caps, such as stars, snowflakes, or other holiday figures, to add an extra decorative touch. These customizable elements allow users to personalize their tree topper stabilizer 100, making it a versatile addition to both home and commercial holiday displays. This feature is especially useful for public venues or stores where cohesive decor themes are important.

In further embodiments, the tree topper stabilizer 100 may be configured to accommodate a range of tree types and branch thicknesses. The gripper legs 128, which interlock with the gripper leg connectors 134 on the threaded tabs 136, can be formed from a flexible material, such as a semi-rigid plastic, metal alloy, or other suitable materials, allowing them to adjust to branches of different sizes and shapes. The gripper legs 128 may also be equipped with spikes 130 along their length, providing additional retention by interlocking with the branches of the tree 302. In this configuration, the collar 124 can be tightened using internal threading, which causes the threaded tabs 136 to flex inward, ensuring that the gripper legs 128 are securely pressed against the branches, stabilizing the tree topper stabilizer 100 even on trees with thinner or more fragile upper branches.

To ensure versatility for various ornament types and sizes, the attachment adapter 112 can be adjustable to allow different orientations of ornaments 202 relative to the base 102. This feature enables the tree topper stabilizer 100 to accommodate a wide range of decorative items, from lightweight to heavy ornaments. For larger or heavier ornaments, additional structural stability is provided by the rod 106 and cone 110 attachments. The cone 110 can include flexible cone tabs 142 that conform to ornaments of varying diameters, making it particularly suitable for hollow ornaments that are otherwise difficult to stabilize. The mounting cone 154, used for smaller ornaments, can be designed with an internal locking mechanism that ensures a firm grip on smaller-diameter ornaments, preventing movement during display.

For further customization, the tree topper stabilizer 100 may include interchangeable ornament attachment options, such as different lengths of rod 106 or various shapes of hook 108, enabling users to select the best attachment based on the size, weight, and design of the ornament. In a commercial setting, multiple sizes of rods 106 could be offered, allowing the tree topper stabilizer 100 to be marketed for use with both small decorative trees and full-sized Christmas trees. This adaptability enhances the stabilizer's market utility, appealing to a broader range of consumers who may wish to use the stabilizer in different settings, including homes, public venues, and event spaces.

In other embodiments, the tree topper stabilizer 100 may be formed from various high-strength materials to accommodate both lightweight and heavier ornaments. These materials may include reinforced polymers, metal alloys, or composite materials, each providing the stabilizer with increased durability and structural integrity.

Additionally, the collar 124 may include gripping prongs 126 on its exterior surface, which are integrally formed to aid users in tightening the collar securely around the threaded tabs 136. In some embodiments, the collar may feature a ratcheting mechanism 160, allowing for incremental tightening and preventing the collar from loosening once the tree topper stabilizer 100 is secured in place. This provides additional peace of mind for users displaying ornaments with significant sentimental or financial value, as the ratcheting mechanism 160 can click into position between the threaded tabs as the collar 124 is rotated to ensure that the stabilizer remains firmly in position throughout the display period.

In a further embodiment, the tree topper stabilizer 100 may be adapted for use in outdoor or commercial settings, where environmental factors such as wind or temperature variations could affect stability. To accommodate these conditions, the stabilizer can include weather-resistant materials, such as stainless steel or UV-resistant plastics, for enhanced durability. Additionally, the collar 124 and gripper legs 128 may be designed with anti-corrosion coatings to prevent rust or degradation from exposure to the elements. For windy conditions, a heavier base 102 or additional stabilizing weights may be added to ensure that the ornament remains secure even in strong gusts. These modifications make the tree topper stabilizer 100 suitable for outdoor public displays, ensuring both stability and longevity in various environmental conditions.

The tree topper stabilizer 100 can be designed for easy assembly and disassembly, with the rod 106, wire rod 104, and gripper legs 128 being removably fastened to the rod mount 114 and base 102. This allows users to quickly swap out attachments or adjust the stabilizer based on the specific requirements of the ornament being displayed. Such flexibility is advantageous for seasonal or event-based ornament displays, where different decorations may be used throughout the year.

In further market variations, the tree topper stabilizer 100 can be adapted for use with artificial trees, where branch thickness and flexibility vary from those of natural trees. The gripper legs 128 can be equipped with adjustable tips, such as rubberized ends, to provide a better grip on the synthetic branches of artificial trees. Additionally, for trees with especially thick branches, the collar 124 can be provided in multiple sizes, allowing for broader or narrower collars to accommodate different tree types.

The tree topper stabilizer 100 is also designed to reduce the risk of damage to ornaments 202, particularly those with high sentimental or monetary value. By providing a stable and secure multi-point gripping system, the stabilizer minimizes the risk of ornaments tilting, falling, or breaking, addressing one of the key shortcomings of prior art solutions. Whether used in a home or commercial setting, the tree topper stabilizer 100 offers a secure and adaptable solution for ornament display, appealing to a wide market of consumers looking for both functional and decorative treetop solutions.

Figure 2:
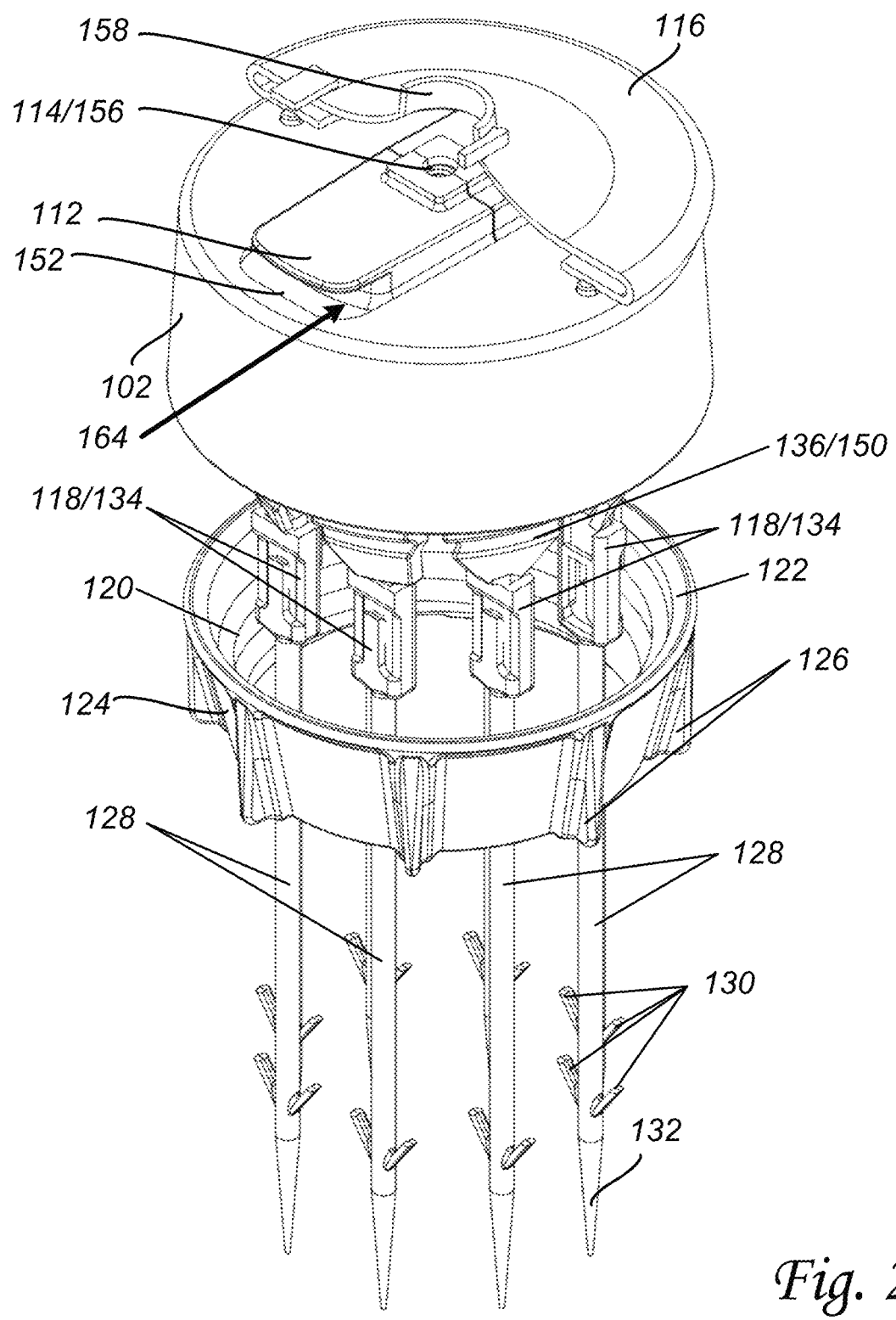
FIGS. 2-3 illustrate one example of a perspective view of a tree topper stabilizer.
Figure 3:
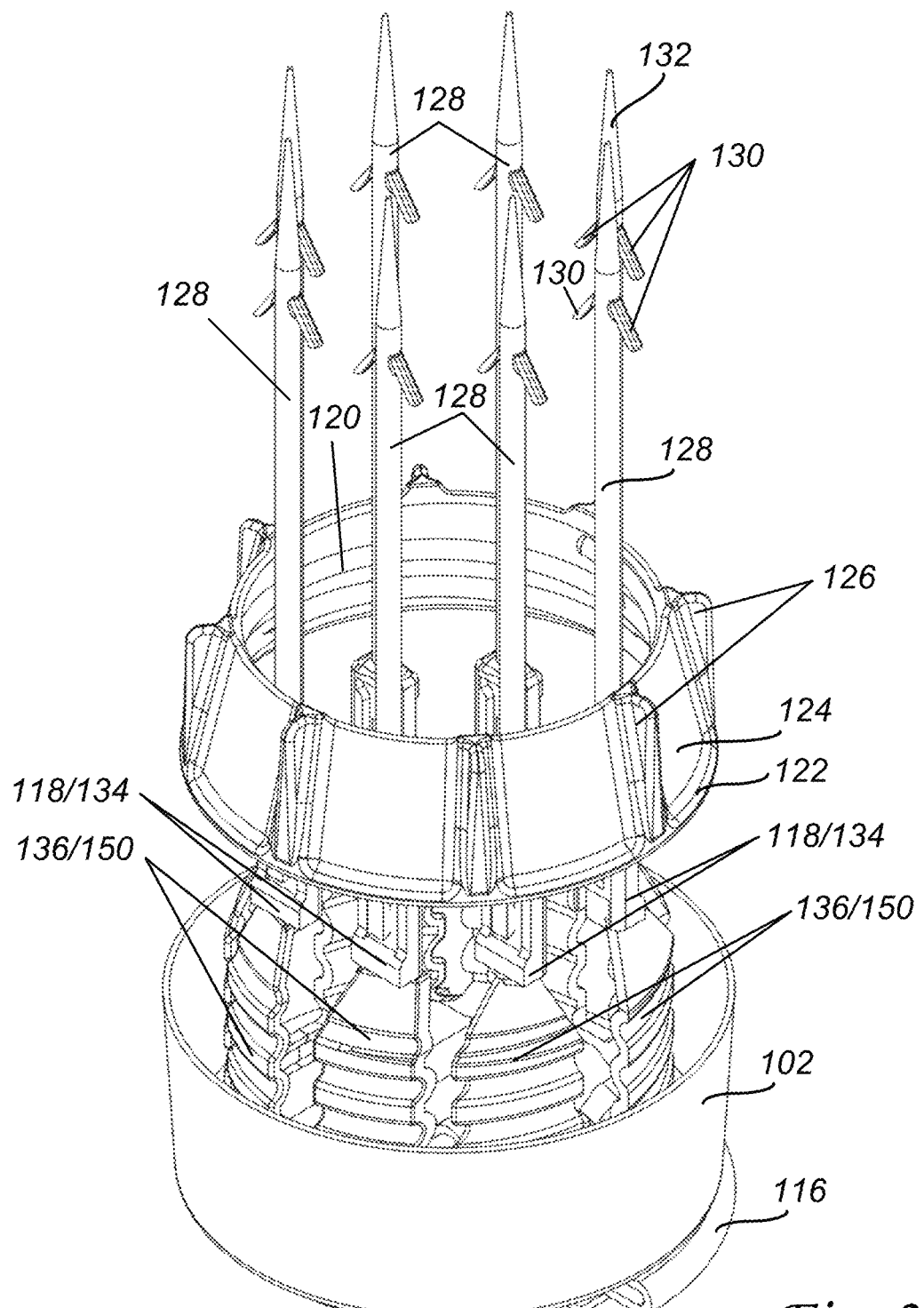

Referring to FIGS. 2 and 3 there is illustrated one example of a perspective view of a tree topper stabilizer 100. In an exemplary embodiment, a tree topper stabilizer 100 can comprise a base 102 having a mounting adapter hole 152, and at least one rod mount 114.

The tree topper stabilizer can further comprise a thread mounting adapter 150 that fastens to the base 102. The threaded mounting adapter 150 can comprise more than one threaded tab 136, more than one gripper leg connector 134 formed on the end of the threaded tab 136, and an attachment adapter 112 that extends through the mounting adapter hole 152 and is accessible on the surface of base 102. The attachment adapter 112 can be used to interconnect with other platforms, attachments, and ornaments that are configured with a suitable mating adapter.

The tree topper stabilizer further comprises a stabilizer 116 fastened to the top of base 102 that can be configured to cover (or not) a portion of the attachment adapter 152.

The tree topper stabilizer further comprises more than one gripper leg 128. The gripper leg 128 can comprise a gripper leg fastener 118 on one end. The gripper leg fastener 118 interlocks with the gripper leg connector 134. Additionally, collar 124 can be fitted around the gripper legs 128. In operation, collar 124 threads around the threaded tabs 136, and as it is tightened constricts the gripper legs 128 against the upper branches of tree 302. The collar 124 can comprise a contoured edge 122 that is configured to engage the bottom edge of the base end when the collar is screwed all the way onto the threaded tabs 136. The contoured edge 122 engaging the bottom of the base ensuring that the collar 124 is not over-tightened, preventing the threaded tabs 136 and gripper legs 128 from being over-flexed.

In operation, the tree topper stabilizer 100 can be fitted on top of tree 302 with the gripper legs 128 penetrating downward through the upper branches of tree 302. The collar 124 when tightened around the thread tabs 134 causes the threaded tabs 134 to flex inward squeezing the gripper legs 128 against the upper branches of the tree 302 firmly holding the tree topper stabilizer 100 in place atop the tree 302. An ornament 202 for display can be interconnected or otherwise secured to the base 102.

In further embodiments, the tree topper stabilizer 100 can be designed with multiple configurations for the base 102, depending on the size and type of ornament 202 being secured. The mounting adapter hole 152 can be dimensioned to allow different sizes of threaded mounting adapters 150, accommodating a wide variety of ornaments with varying weight and size requirements. The rod mount 114 can also be positioned in different locations on the base 102, offering users flexibility in how the ornament is displayed, such as centrally or slightly offset to match the ornament's design or balance. This customization option can be particularly beneficial for consumers who wish to display asymmetrical or uniquely shaped ornaments that require specific orientations.

To enhance stability, the threaded mounting adapter 150 can be reinforced with additional support structures, such as radial support ribs 162 extending from the attachment adapter 112 to the outer edges of the base 102 or the threaded mounting adapter 150. These support ribs 162 provide increased structural integrity for the base 102 and or threaded mounting adapter 150, allowing it to support heavier ornaments without deforming or losing stability. In commercial or public display settings, where large or elaborate ornaments may be used, this added reinforcement ensures that the tree topper stabilizer 100 maintains its stability even under the weight of more substantial decorations. The support ribs 162 can be formed on the interior or exterior surfaces of the base 102 or the threaded mounting adapter 150 as may be required and/or desired in a particular embodiment.

In an exemplary embodiment, the base 102 of the tree topper stabilizer 100 may be designed with reinforced support ribs that extend from the center of the base toward the outer edge, providing increased structural integrity for supporting larger and heavier ornaments. This reinforced structure ensures that even heavy decorations remain stable when secured by the stabilizer. This embodiment is especially useful for commercial applications, where oversized or intricate ornaments are often displayed, requiring enhanced stability from the tree topper stabilizer 100.

In an exemplary embodiment, the attachment adapter 112 can be equipped with a slide-and-lock mechanism 164 that allows for quick and secure interconnection with various ornament platforms or attachments. This design not only simplifies the process of attaching ornaments but also ensures that the ornament 202 remains securely fastened during display. The slide-and-lock 164 feature can be particularly advantageous in public or commercial venues where ornaments may need to be swapped out frequently, or where additional security is required to prevent accidental dislodgement of ornaments due to environmental factors, such as wind or accidental contact.

The gripper legs 128 of the tree topper stabilizer 100 can be designed with an adjustable 166 length feature, allowing users to extend or retract 166 the gripper legs 128 based on the thickness of the tree branches they are securing against. This adjustability enhances the stabilizer's versatility, making it suitable for trees with varying branch thicknesses, whether natural or artificial. In some market variations, the gripper legs 128 can be equipped with interchangeable tips, such as rubberized ends for use with artificial trees, or spiked ends for natural trees, providing additional grip based on the type of tree in use.

The collar 124 may also be available in different sizes and materials to accommodate different tree sizes and ornament weights. In one embodiment, the collar 124 may be made of a high-strength polymer to ensure durability while maintaining a lightweight profile, making it easier to tighten around the threaded tabs 136 without requiring excessive force. In some configurations, the collar 124 may be equipped with a ratcheting mechanism, allowing for incremental tightening and preventing backward movement once the collar is in place. This feature ensures that the gripper legs 128 remain securely pressed against the branches, even if the tree is bumped or jostled.

In operation, as the collar 124 tightens around the threaded tabs 136, the threaded tabs 136 flex inward, causing the gripper legs 128 to press firmly against the branches of the tree 302. This inward flexion creates a stable grip, ensuring that the tree topper stabilizer 100 remains securely in place, even with heavier ornaments attached. For consumers using fragile or sentimental ornaments, this design offers peace of mind by significantly reducing the risk of the ornament falling or becoming dislodged.

In some embodiments, the collar 124 may be offered in multiple sizes and configurations, allowing users to select the appropriate collar based on the tree size and the type of ornament being displayed. For commercial applications, a heavy-duty collar with a ratcheting mechanism 160 may be used, allowing for incremental tightening and enhanced stability for larger ornaments. Additionally, the collar may feature anti-slip coatings or reinforced prongs for improved grip when securing ornaments in outdoor or high-traffic environments. This variation ensures that the tree topper stabilizer 100 can withstand the demands of various settings, providing reliable support for ornaments in both residential and commercial displays.

In market variations, the tree topper stabilizer 100 can be adapted for different tree types and ornament sizes. For example, a larger version of the tree topper stabilizer 100 can be designed for use with full-sized Christmas trees, while a smaller version may be tailored for tabletop or miniature trees. Additionally, the gripper legs 128 can be made in various lengths to accommodate both dense and sparsely branched trees. In commercial applications, multiple stabilizers may be used in conjunction to support larger ornamental displays, such as those used in store window decorations or public holiday displays.

In other embodiments, the collar 124 may be offered in different diameters to accommodate a wide variety of tree sizes. For particularly large or small trees, users can select collars that apply the optimal level of gripping force while maintaining ornament stability.

The tree topper stabilizer 100 can also support additional attachments, such as lighted ornaments, by incorporating a wired or wireless power connector through the attachment adapter 112. This feature allows for seamless integration of electrical components without compromising the stabilizer's structural integrity. The power connector can be designed to work with common holiday lighting systems, further enhancing the versatility of the tree topper stabilizer 100 for use in both residential and commercial settings.

In operation, after the gripper legs 128 are secured against the branches of tree 302, ornaments 202 can be interconnected or otherwise secured to the threaded mounting adapter 150 using the selected attachments. The rod 106, hook 108, or cone 110 can be used to display a variety of ornaments, including those with hollow interiors or unique shapes. In some embodiments, the wire rod 104 can be used to grip ornaments directly, offering additional options for displaying delicate or irregularly shaped items that may not easily rest on other attachments. This flexibility makes the tree topper stabilizer 100 suitable for a wide range of decorative applications.

Figure 4:
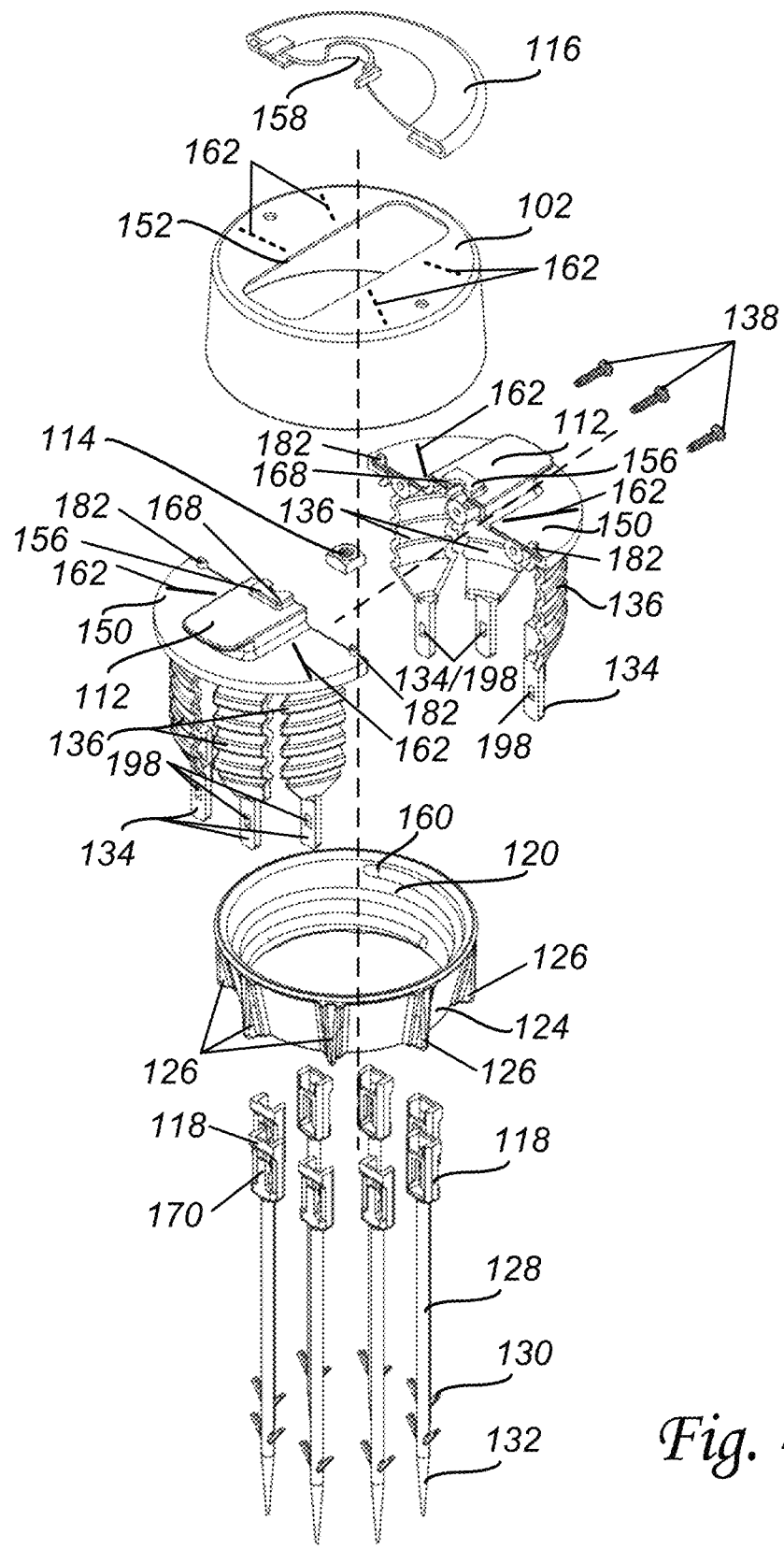
FIG. 4 illustrates one example of a disassembled view of a tree topper stabilizer.

Referring to FIG. 4 there is illustrated one example of a disassembled view of a tree topper stabilizer 100. In an exemplary embodiment, base 102 can be fitted over the threaded mounting adapter 150 to provide a flat surface to place ornaments as well as conceal the inner assemble associated with the threaded mounting adapter 150. The threaded mounting adapter 150 can be formed of two halves that are fastened together by fasteners 138 such as screws, or by other suitable fasteners or methods. Additionally, threaded mounting adapter 150 can have an integrally formed rod mount housing 156. The rod mount 114 can be a nut or other suitable fastener which is secured by way of the rod mount housing 156.

In an exemplary embodiment, the threaded mounting adapter 150 comprises mounting pegs 182 that serve to securely anchor both the base 102 and the large base 172 in position, preventing any unwanted rotational movement. Specifically, the mounting pegs 182 are strategically placed to ensure that the base 102 remains fixed and aligned, avoiding any shifting or slipping once installed on the tree. This feature is particularly important in cases where the tree branches may exert pressure on the stabilizer, as the mounting pegs 182 lock the base in place and prevent any rotational slippage that could compromise the stability of the ornament.

Furthermore, in the case of the large base 172, the mounting pegs 182 are designed to prevent over-rotation, ensuring that the stabilizer maintains its correct alignment while supporting heavier or larger ornaments. The large base provides additional support for oversized decorations, and the mounting pegs 182 act as a fail-safe to stop the base from rotating beyond its intended position, thus preventing any misalignment or loss of balance. This ensures that both lightweight and heavier ornaments remain upright and securely mounted, regardless of the tree type or the ornament's size.

The integration of the mounting pegs 182 with the threaded mounting adapter 150 allows for quick and secure installation of both the base 102 and the large base 172, enhancing the overall stability of the tree topper stabilizer 100 and making it suitable for a variety of decorative setups, including those with heavier or more delicate ornaments.

In an exemplary embodiment, a rod 106 can be removably fastened to the rod mount 114. The rod extends upward from the threaded mounting adapter 150. In operation, ornament 202 can be placed or otherwise displayed on rod 106. Rod 106 is better illustrated in at least FIGS. 12 and 14. Furthermore, rod 103 can be permanently or removably fastened to rod mount 114 as may be required and or desired in a particular embodiment.

In an exemplary embodiment, stabilizer 116 is semicircle in shape and comprises a semicircle collar 158 over the top of and proximate to the rod mount 114 when assembled. In operation, the semicircle collar 116 can provide additional stabilizing force to rod 106 as it extends upward from connection with rod mount 114.

In an embodiment designed for high-traffic areas or commercial applications, the tree topper stabilizer 100 may be enhanced with reinforced joints and impact-resistant materials. For instance, the rod mount 114 can be reinforced with internal bracing to prevent damage during frequent ornament changes or assembly/disassembly. The collar 124 may also feature additional reinforcement to prevent wear from repeated tightening and loosening. This ensures that the stabilizer maintains its integrity even after long-term use or exposure to rough handling, making it ideal for public settings where decorations are frequently updated.

In commercial environments, the tree topper stabilizer 100 is designed for rapid ornament changes, allowing users to swap out decorations with minimal downtime. The threaded mounting adapter 150 and collar 124 are configured for frequent assembly and disassembly, making the system ideal for environments where ornament displays must be adjusted regularly.

Figure 16:
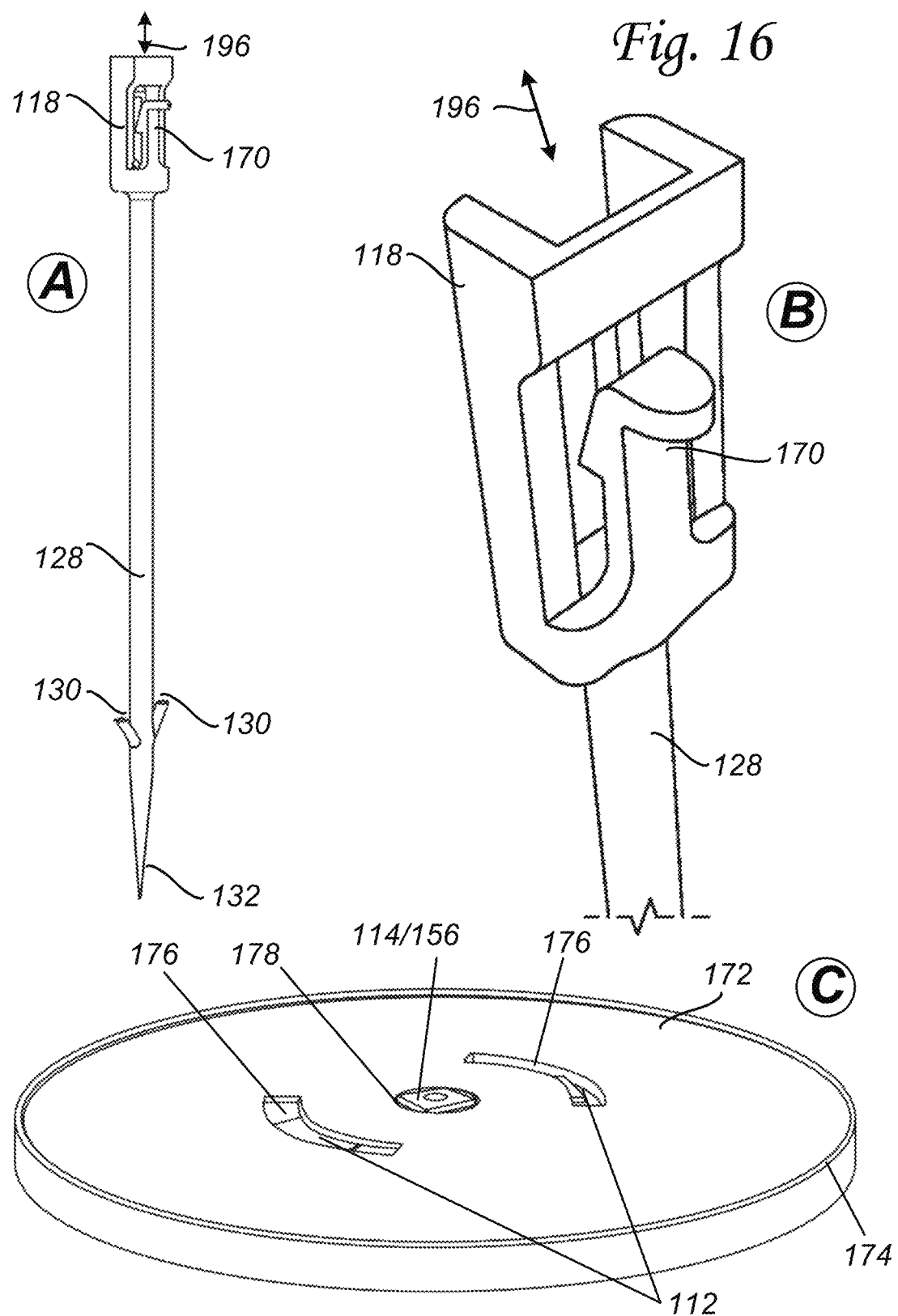
FIG. 16 illustrates one example of a gripper leg, a gripper leg connector, and a large base.

In an exemplary embodiment, as better illustrated in FIG. 16, the gripper leg fastener 118 interlocks with the gripper leg connector 134 using a secure locking mechanism. This mechanism involves a locking tab 170, which is an integral part of the gripper leg fastener 118, engaging in a removable manner with a tab slot 198 that is part of the gripper leg connector 134. This design allows for a precise and stable connection between the gripper leg 128 and the threaded tabs 136, ensuring that the gripper legs remain firmly in place during use.

The locking tab 170 is engineered to easily slide into the tab slot 198, providing a strong but flexible engagement. This feature ensures that the gripper leg fastener 118 securely holds the gripper legs 128 against the tree branches while still allowing for easy removal or repositioning when necessary. The removable nature of this interlocking mechanism is advantageous because it allows users to adjust or replace the gripper legs 128 depending on the tree's branch size or type, without compromising stability.

Moreover, the locking tab 170 and tab slot 198 connection is designed to withstand external forces, such as the weight of heavy ornaments or environmental factors like wind, which can cause movement in the tree. By providing a secure and adaptable connection, the locking mechanism prevents the gripper legs 128 from shifting or loosening over time, ensuring the tree topper stabilizer 100 remains firmly in place.

This interlocking design also facilitates easy assembly and disassembly of the stabilizer, making it ideal for users who frequently change ornaments or need to adjust the stabilizer's position. Whether for home or commercial use, this secure yet flexible system provides the perfect balance of stability and convenience, ensuring that ornaments stay securely mounted while allowing for easy adjustment as needed.

Additionally, the gripper leg 128 can comprise at least one spike 130 disposed along the length of the gripper leg 128. Spikes 130 are configured to intermingle with the branches of tree 302 to provide additional retention grip from slippage of the tree topper stabilizer 100. As may be required and/or desired in a particular embodiment, one end of the gripper leg 128 can be formed into a point 132 to aid in the insertion of the gripper leg 128 down into the branches of tree 302.

In an exemplary embodiment, the interior surface of collar 124 is threaded 120 and configured to screw onto the threaded tabs 136. And, collar 124 can comprise gripping prongs 126 that are integrally formed on the exterior surface of the collar to aid a user in tightening the collar around the threaded tabs 136.

In some embodiments, base 102 may be constructed from materials such as high-strength plastic, reinforced aluminum, or other composites, depending on the weight and size of the ornaments being supported. This allows the tree topper stabilizer 100 to support heavier ornaments without compromising structural integrity. The base's ability to be formed from two halves, secured by fasteners 138, also enables easy assembly and disassembly for storage or transport. This feature makes the stabilizer particularly suitable for seasonal or temporary displays, allowing for quick setup and compact storage when not in use.

The rod mount housing 156, integrally formed in the base 102, securely holds the rod mount 114, which may be a nut or other suitable connector. In some embodiments, the rod mount 114 may include a locking mechanism 168, such as a quick-release latch or spring-loaded detent, allowing for easy attachment or removal of rod 106. This feature enhances flexibility by enabling users to quickly swap out different ornament attachments without the need for tools, making the stabilizer ideal for settings that require frequent changes, such as store displays or event venues.

The rod 106, which extends upward from the rod mount 114, may be available in multiple lengths or diameters to accommodate various ornament sizes and weights. For smaller, lightweight ornaments, a thinner rod may be used to maintain a subtle appearance, while a thicker, reinforced rod may be selected for heavier ornaments. In some configurations, rod 106 may come in different finishes, such as chrome or powder-coated colors, to match different decorative themes, offering users a customizable solution for various aesthetic preferences.

The semicircle collar 158 provides additional support to the rod 106 as it extends from the rod mount 114. This collar may be adjustable, allowing users to apply varying degrees of stabilizing pressure to ensure that the rod remains firmly in place, even when supporting larger or top-heavy ornaments. By securing the rod 106 at its base and providing additional reinforcement, the semicircle collar 158 minimizes any movement or tilting of the ornament during display.

The gripper legs 128 may come in various lengths or designs to accommodate different tree branch sizes and configurations. Additionally, spikes 130 along the length of the gripper legs 128 provide extra grip by interlocking with the branches of the tree, preventing slippage. For artificial trees, gripper legs 128 may be equipped with rubberized or softer tips, while for natural trees, pointed ends 132 can aid in penetrating through dense branches. This versatility allows the tree topper stabilizer 100 to be used across different tree types, ensuring that it provides a stable and secure attachment regardless of the tree's branch structure.

The collar 124, with its threaded interior 120, screws onto the threaded tabs 136, ensuring a secure fit. The addition of gripping prongs 126 on the exterior surface provides users with enhanced leverage when tightening the collar, allowing for a firm attachment of the stabilizer without the need for additional tools. In some embodiments, the collar may incorporate a ratcheting mechanism 160 to allow incremental tightening, preventing the collar from loosening over time. This feature is particularly beneficial for users displaying heavier or sentimental ornaments, offering peace of mind that the ornament will remain securely fastened during its display.

In another embodiment, the tree topper stabilizer 100 may include additional safety mechanisms to ensure that the ornament remains securely fastened, particularly in commercial or public displays. For instance, the gripper legs 128 can be equipped with locking mechanisms that automatically engage once the collar 124 is fully tightened. This prevents the gripper legs from loosening over time, providing extra security for ornaments in high-traffic areas. Similarly, the attachment adapter 112 may include a locking pin system to ensure that once the ornament is placed, it cannot be easily removed or displaced, reducing the risk of theft or accidental damage.

Once fully assembled, the tree topper stabilizer 100 offers a reliable and customizable solution for securing a wide range of ornaments. Its modular design allows for easy assembly and disassembly, and its various attachment options ensure it can accommodate ornaments of different shapes, sizes, and weights. This versatility makes the stabilizer suitable for both residential and commercial applications, ensuring ornaments are displayed securely and attractively at the top of the tree.

Figure 5:
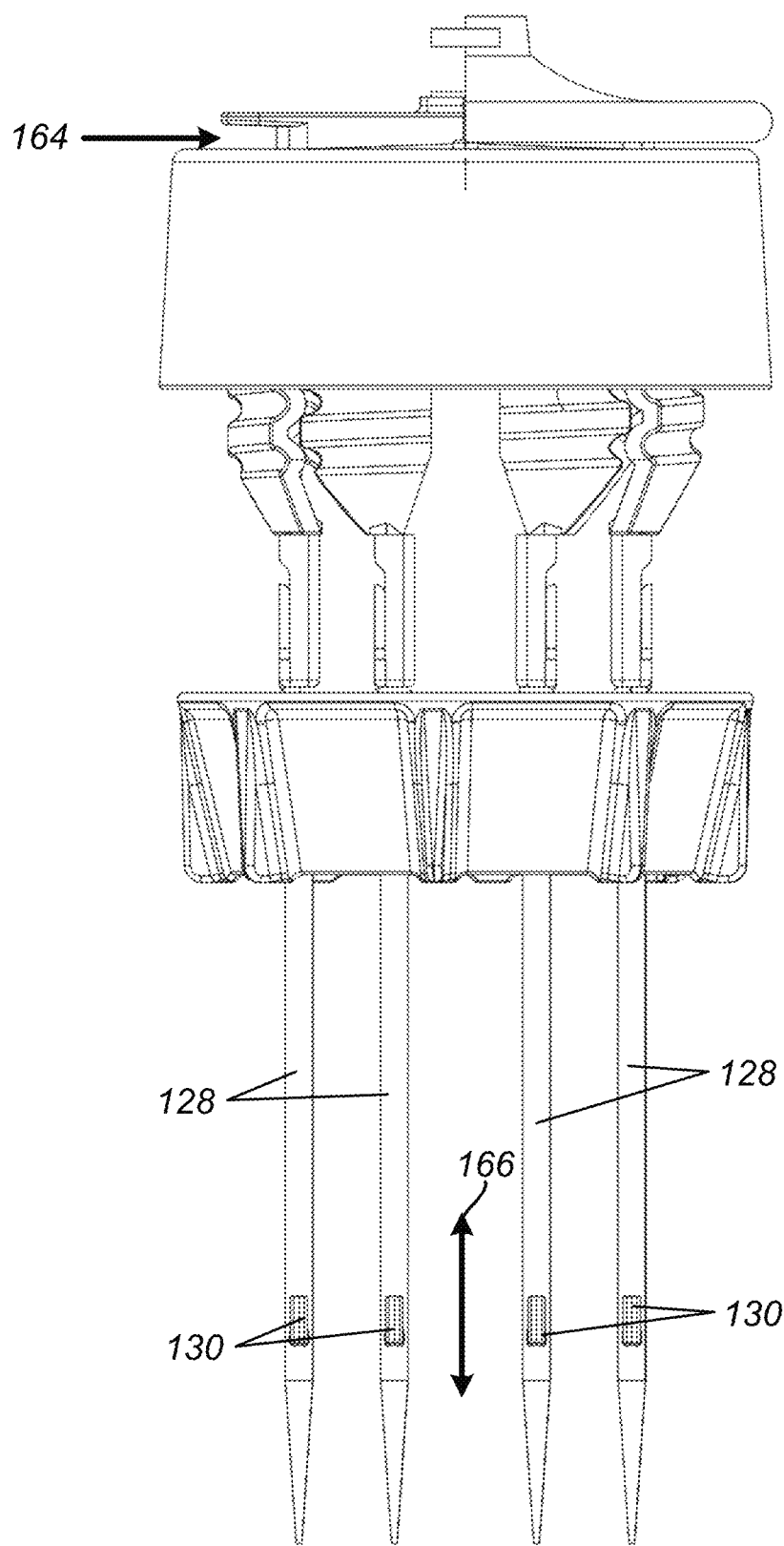
FIG. 5 illustrates one example of a front view of a tree topper stabilizer.
Figure 6:
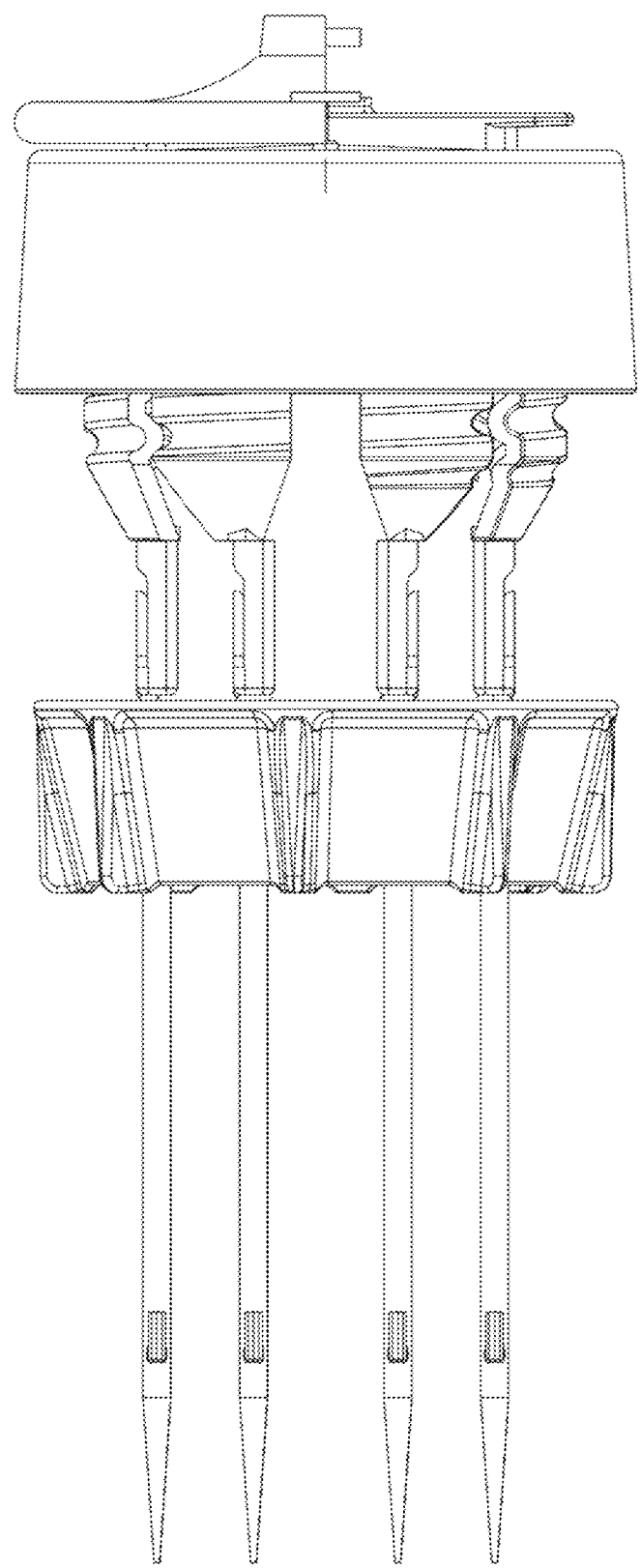
FIG. 6 illustrates one example of a back view of a tree topper stabilizer.
Figure 7:
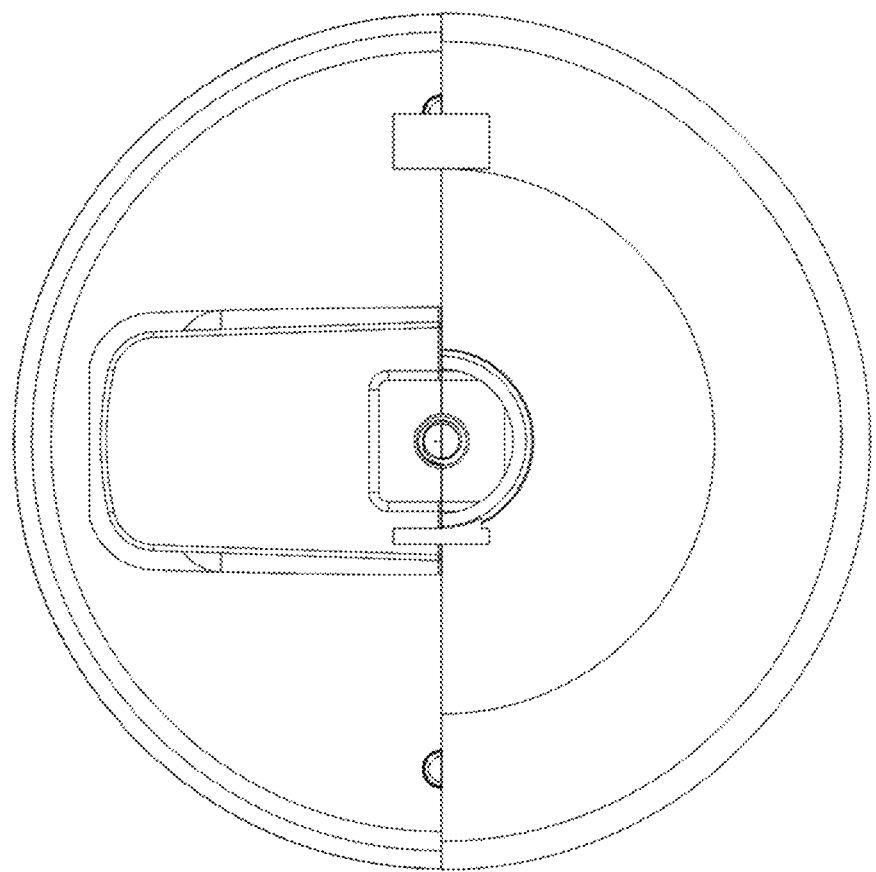
FIG. 7 illustrates one example of a top view of a tree topper stabilizer.
Figure 8:
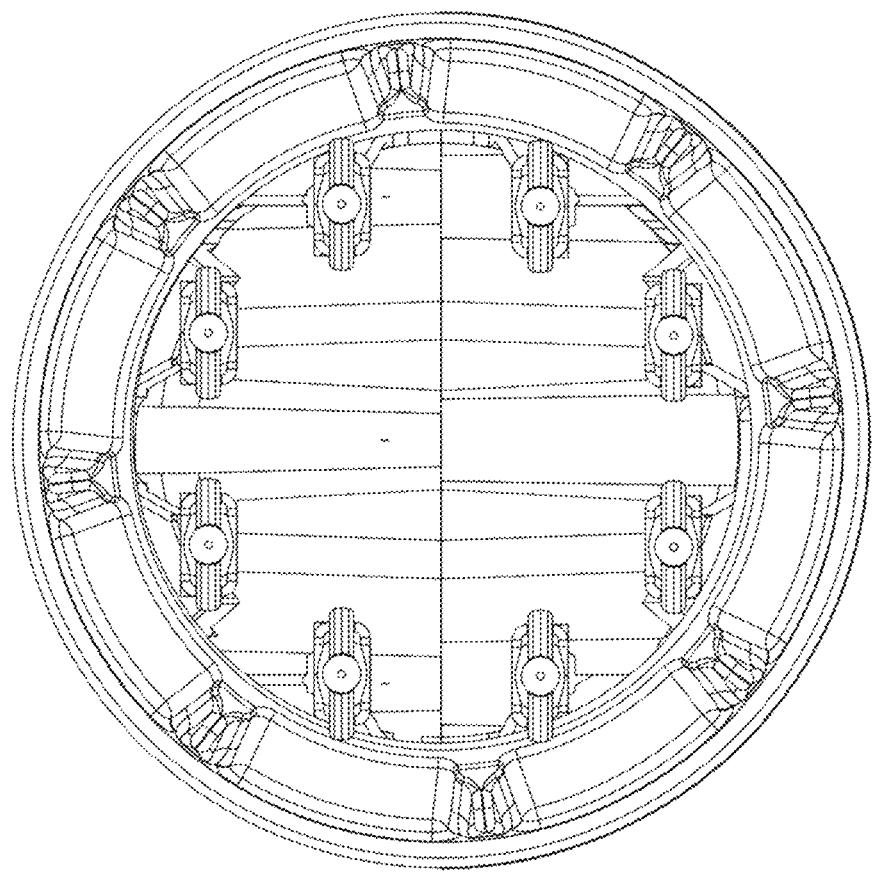
FIG. 8 illustrates one example of a bottom view of a tree topper stabilizer.
Figure 9:
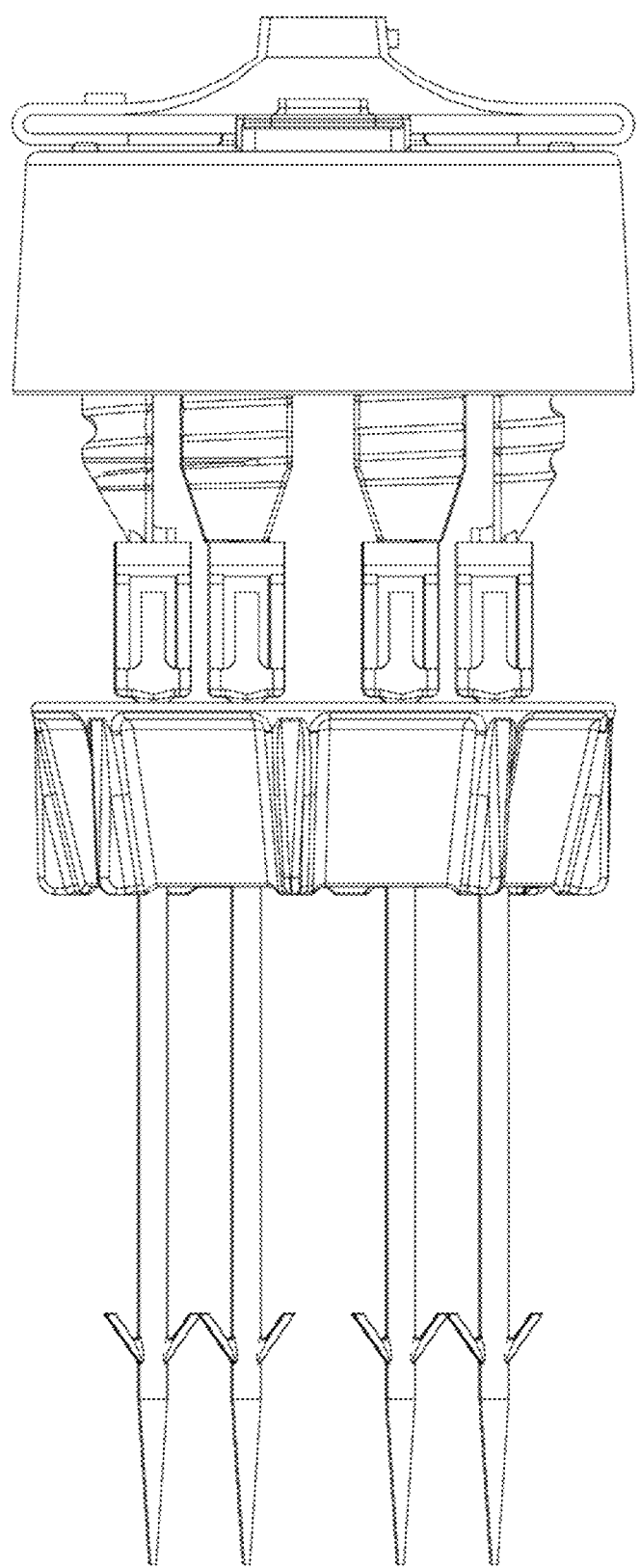
FIG. 9 illustrates one example of a left view of a tree topper stabilizer.
Figure 10:
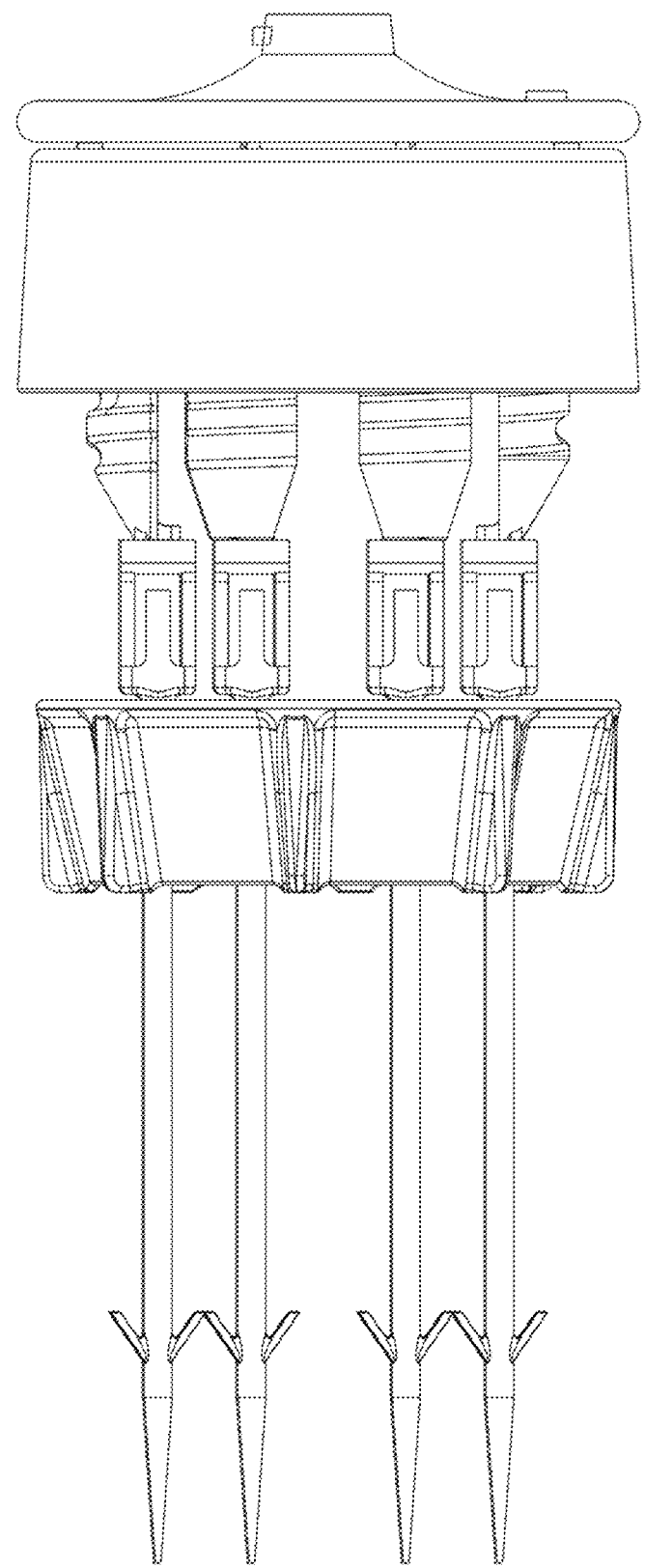
FIG. 10 illustrates one example of a right view of a tree topper stabilizer.

Referring to FIG. 5 there is illustrated one example of a front view of a tree topper stabilizer 100. Referring to FIG. 6 there is illustrated one example of a back view of a tree topper stabilizer 100. Referring to FIG. 7 there is illustrated one example of a top view of a tree topper stabilizer 100. Referring to FIG. 8 there is illustrated one example of a bottom view of a tree topper stabilizer 100. Referring to FIG. 9 there is illustrated one example of a left view of a tree topper stabilizer 100. Referring to FIG. 10 there is illustrated one example of a right view of a tree topper stabilizer 100.

In an exemplary embodiment, FIGS. 5 through 10 provide multiple views of the tree topper stabilizer 100, illustrating its overall structure and how its components interact from different angles. In FIG. 5 (front view), the alignment of rod 106 with base 102 is clearly shown, demonstrating how rod 106 extends upward from rod mount 114. This view also highlights the positioning of the gripper legs 128, which can be seen radiating outward from the base 102 to ensure a stable grip on the branches of the tree. The gripper leg connectors 134 and the interlocking mechanism with the gripper leg fasteners 118 are visible, showcasing how these components engage to secure the stabilizer in place.

FIG. 6 (back view) provides a different perspective, emphasizing the attachment adapter 112 extending through the base 102 and showing how it can connect to various ornament platforms. The view also demonstrates the collar 124 in its tightened position around the threaded tabs 136, showing how the collar flexes the tabs inward to press the gripper legs 128 securely against the branches. The back view helps to visualize how the stabilizer is locked in place from a rearward angle, and how the system maintains balance when an ornament is attached.

FIG. 7 (top view) illustrates the layout of the semicircle collar 158 relative to the rod mount 114. This view allows users to appreciate the symmetry and design of the stabilizer, as well as the placement of the gripping prongs 126 on the outer surface of the collar 124, which provides additional leverage for tightening. The top view also shows the spacing between the gripper legs 128, which ensures a secure fit on various tree branch configurations. The circular arrangement of the gripper legs 128 provides a balanced grip on the tree's branches, preventing tilting or shifting once the ornament is attached.

FIG. 8 (bottom view) focuses on the underside of the tree topper stabilizer 100, revealing the structure of the base 102 and the positioning of the mounting adapter hole 152. The threaded tabs 136 are clearly visible from this angle, illustrating how they are anchored to the base 102 and how the collar 124 interacts with these tabs to secure the stabilizer to the tree. This view also shows the rod mount housing 156 from below, providing insight into how rod 106 is fastened securely to the threaded mounting adapter 150 through the rod mount 114.

FIG. 9 (left view) and FIG. 10 (right view) offer side perspectives of the tree topper stabilizer 100, showing how rod 106 extends upward from the rod mount 114. These views also demonstrate the semicircle collar 158's relationship to rod 106, offering a clearer understanding of how collar 124 stabilizes the rod and prevents it from wobbling during ornament display. Additionally, these side views highlight the even distribution of the gripper legs 128 around the stabilizer, ensuring equal pressure is applied to all sides of the tree's branches, which helps keep the stabilizer level even when heavier ornaments are used.

Together, these views offer a comprehensive understanding of the tree topper stabilizer 100 from multiple angles, demonstrating the balance, stability, and flexibility it provides in securing ornaments of various shapes and sizes. The combination of different attachment options, such as the rod 106, hook 108, and cone 110, along with the adaptable gripper legs 128 and adjustable collar 124, ensures that the stabilizer can meet the needs of a wide range of users, whether for residential or commercial holiday displays.

Figure 11:
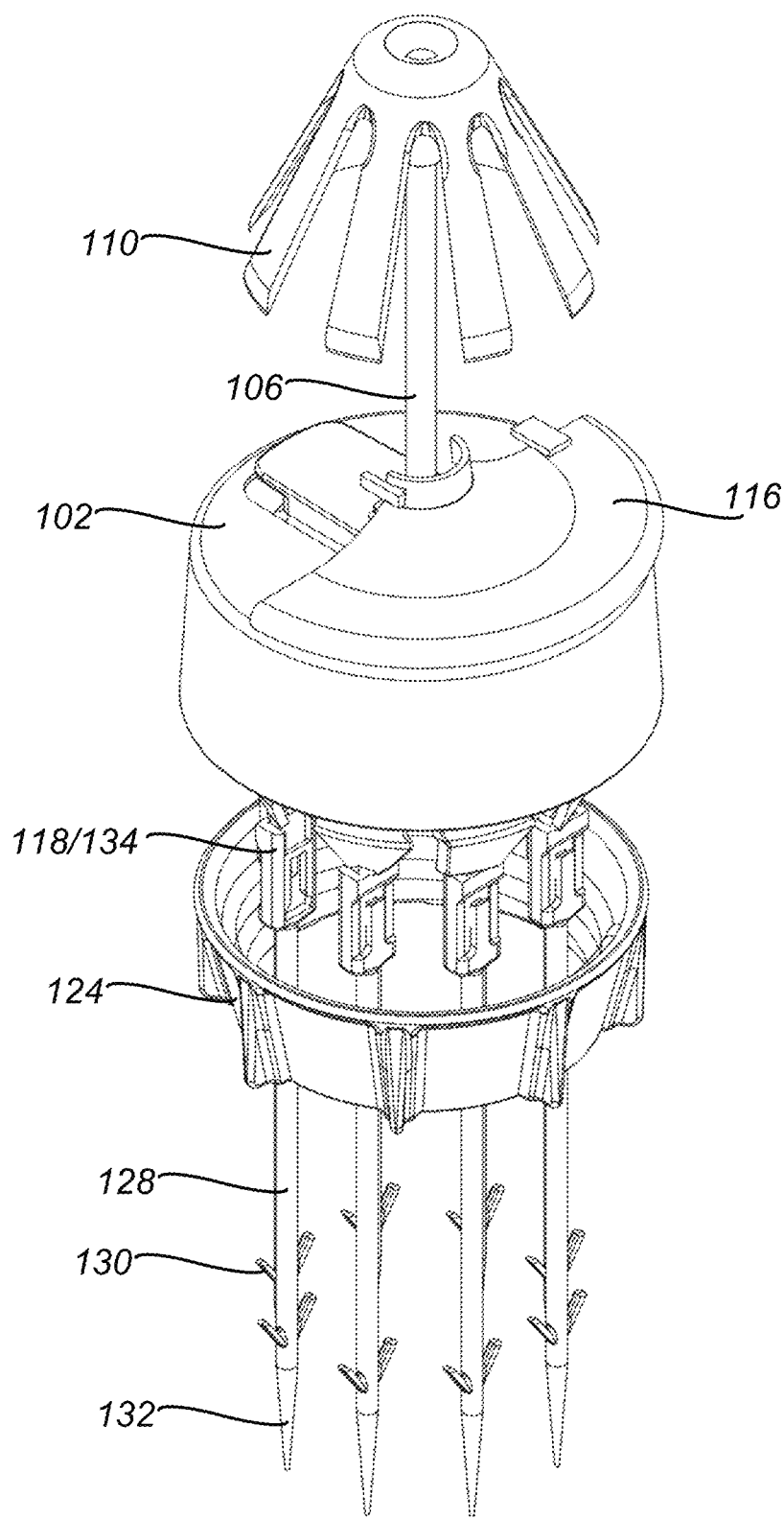
FIG. 11 illustrates one example of a perspective view of a tree topper stabilizer with rod and cone attachments.

Referring to FIG. 11, there is illustrated an exemplary perspective view of the tree topper stabilizer 100 with both a rod 106 and a cone 110 attachment. This perspective highlights how rod 106 extends vertically from rod mount 114 and how cone 110 is attached at the free end of the rod. In this embodiment, the cone 110 comprises multiple flexible cone tabs 142 that together form a secure base for ornaments with hollow interiors, such as delicate angels or large decorative stars. The flexible nature of the cone tabs 142 allows them to adapt to ornaments of varying sizes, ensuring that the ornament is held firmly in place without risk of tilting or falling. The perspective view also clearly shows how the gripper legs 128 extend outward from the base 102, offering a balanced and secure foundation by gripping the tree's branches from multiple angles.

The design of the cone 110 in FIG. 11 provides versatility for a wide range of ornament types. The cone tabs 142 can flex inward or outward, depending on the size of the ornament, making this attachment suitable for both small and large hollow ornaments. This adaptability is particularly advantageous in settings where the user may want to switch between different ornaments without changing the underlying attachment mechanism. The rod 106 provides additional height, allowing ornaments to be displayed prominently at the top of the tree, ensuring that they are visible from a distance and stand out among other decorations. The perspective view also highlights the symmetrical design of the tree topper stabilizer 100, ensuring that the ornament remains level, even if the tree branches vary in thickness.

Figure 12:
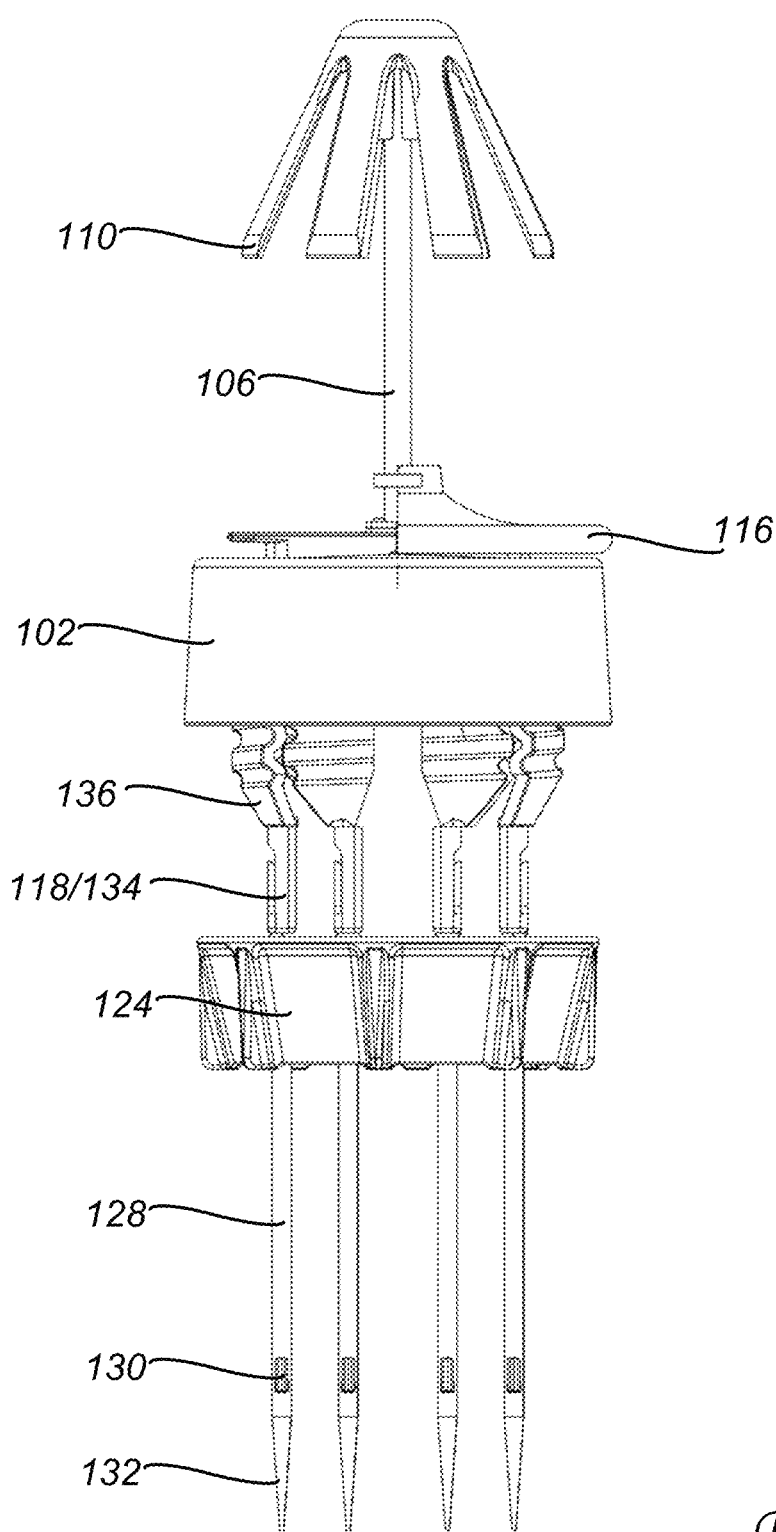
FIG. 12 illustrates one example of a front view of a tree topper stabilizer with rod and cone attachments.

Referring to FIG. 12, there is illustrated a front view of the tree topper stabilizer 100 with the rod 106 and cone 110 attachments in place. This view focuses on how rod 106 extends vertically from rod mount 114, with cone 110 attached at its free end. The front view offers a clear depiction of the cone 110 and its cone tabs 142, which are configured to provide a flexible, secure platform for ornaments with wide or hollow bases. The cone 110 can support ornaments of various shapes, including those that may not sit well on traditional flat or rigid surfaces.

In this embodiment, rod 106 is securely fastened to the rod mount 114, ensuring that it remains upright and stable, even when supporting heavier ornaments. The gripper legs 128, which are visible from this view, extend outward from the base 102 and are secured in place by the collar 124. This configuration ensures that the stabilizer maintains a firm grip on the branches of the tree, preventing the ornament from tilting or shifting. The front view also highlights the gripping prongs 126 on the collar 124, which provide users with enhanced leverage for tightening the stabilizer around the tree branches.

In another embodiment, the tree topper stabilizer 100 can be designed to facilitate quick installation and frequent ornament changes. The rod 106, gripper legs 128, and collar 124 can be engineered to withstand repeated handling without wear or damage. For public displays where decorations may be updated frequently, the stabilizer's components are designed to be easy to assemble and disassemble, ensuring that ornaments can be swapped out efficiently. Additionally, the stabilizer's gripper legs 128 may feature quick-release mechanisms, allowing the stabilizer to be quickly repositioned or removed without damaging the tree branches or decorations.

The combination of the rod 106 and cone 110 attachments, as seen from both the perspective and front views, offers a highly adaptable system for displaying a variety of ornaments. The Rod 106 provides the necessary height and visibility for ornaments at the top of the tree, while cone 110 ensures that even hollow ornaments with uneven bases are securely supported. The ability of the cone tabs 142 to flex inward or outward further enhances the adaptability of the stabilizer, making it suitable for a wide range of ornaments, from lightweight holiday stars to larger decorative pieces. This flexibility is particularly useful in commercial or public settings, where different types of ornaments may be swapped out throughout the holiday season.

Together, FIGS. 11 and 12 demonstrate the versatility and functionality of the tree topper stabilizer 100 with rod 106 and cone 110 attachments. The stabilizer's modular design, combined with its ability to securely grip tree branches and support a variety of ornaments, ensures that it can meet the needs of different users, whether in residential, commercial, or public displays. The flexibility of the cone 110 and the secure height provided by the rod 106 makes this configuration ideal for both traditional holiday ornaments and more complex, decorative pieces.

Referring to FIGS. 13 and 14, there is illustrated one example of a cone 110 attachment designed to securely hold a variety of ornaments. In FIG. 13, reference 'A' shows a perspective view of the cone 110, which highlights the arrangement of the cone tabs 142. These tabs can be made from materials with varying flexibility, depending on the type of ornament being supported. In operation, the cone 110 has a central hole or mount 140 that fits securely on the end of the rod 106, providing a stable platform for ornaments. The cone tabs 142 are arranged around the central mount 140, forming a flexible base that adapts to the ornament's shape, ensuring it remains secure without the risk of tilting or falling.

FIG. 13, reference 'B' provides a top view of the cone 110, illustrating how the cone tabs 142 radiate outward from the central mount 140. This view clearly shows the arrangement of the cone tabs 142, which together form a stable surface for ornaments of various sizes. The flexibility of the cone tabs 142 allows them to gently cradle ornaments with hollow or irregular bases, ensuring a secure grip. The central mount 140 provides a secure connection with the rod 106, ensuring that the ornament remains balanced and upright.

FIG. 13, reference 'C' offers a bottom view of the cone 110, showing how the central mount 140 fits over the end of the rod 106. This bottom view illustrates how the central mount 140 provides a secure attachment point for the cone 110, ensuring that the ornament 202 remains firmly supported during display. The cone tabs 142 provide additional stability, forming a base that adapts to the ornament's weight and size, preventing any unwanted movement or slippage.

Referring to FIG. 14, reference 'A' provides a top perspective view of the cone 110 attachment. This view shows how the cone tabs 142 are arranged to flex inward or outward, depending on the size and shape of the ornament. The central mount 140, which is securely fitted onto the rod 106, provides a stable connection that supports the ornament's weight and ensures that it remains in an ideal display position at the top of the tree.

FIG. 14, reference 'B' illustrates a bottom perspective view of the cone 110, showing the underside of the central mount 140 and how it fits over the rod 106. This view highlights the robust connection between the rod 106 and the cone 110, ensuring that the ornament remains securely supported, even if the tree is disturbed. The cone tabs 142 provide additional adaptability, making the cone 110 suitable for ornaments with hollow interiors or uneven bases.

In an exemplary embodiment, the cone 110 can be produced in multiple sizes to accommodate different ornament dimensions. Smaller versions may be more rigid for lightweight ornaments, while larger versions of the cone 110 feature more flexible cone tabs 142 to support heavier or hollow ornaments. The versatility of the cone 110 ensures that it can adapt to various ornament designs and display needs, making it ideal for both residential and commercial displays.

The central mount 140 of the cone 110, fitting over the rod 106, ensures that the ornament is displayed prominently and remains stable. The combination of the height provided by the rod 106 and the flexibility of the cone tabs 142 allows for the secure display of a wide range of ornaments, ensuring that they are highly visible and stable during use.

In operation, the cone 110 attachment, as illustrated in FIGS. 13 and 14, offers a flexible, reliable solution for displaying ornaments with hollow or irregular bases. The ability to adjust the size and flexibility of the cone tabs 142, combined with the secure fit of the central mount 140 on the rod 106, ensures that ornaments remain securely in place without risking damage or instability.

During installation, the user can adjust the cone 110 to accommodate the size and shape of the ornament. Flexible cone tabs 142 are designed to cradle hollow ornaments securely, and users can select the appropriate cone size based on the interior dimensions of the ornament.

Figure 15:
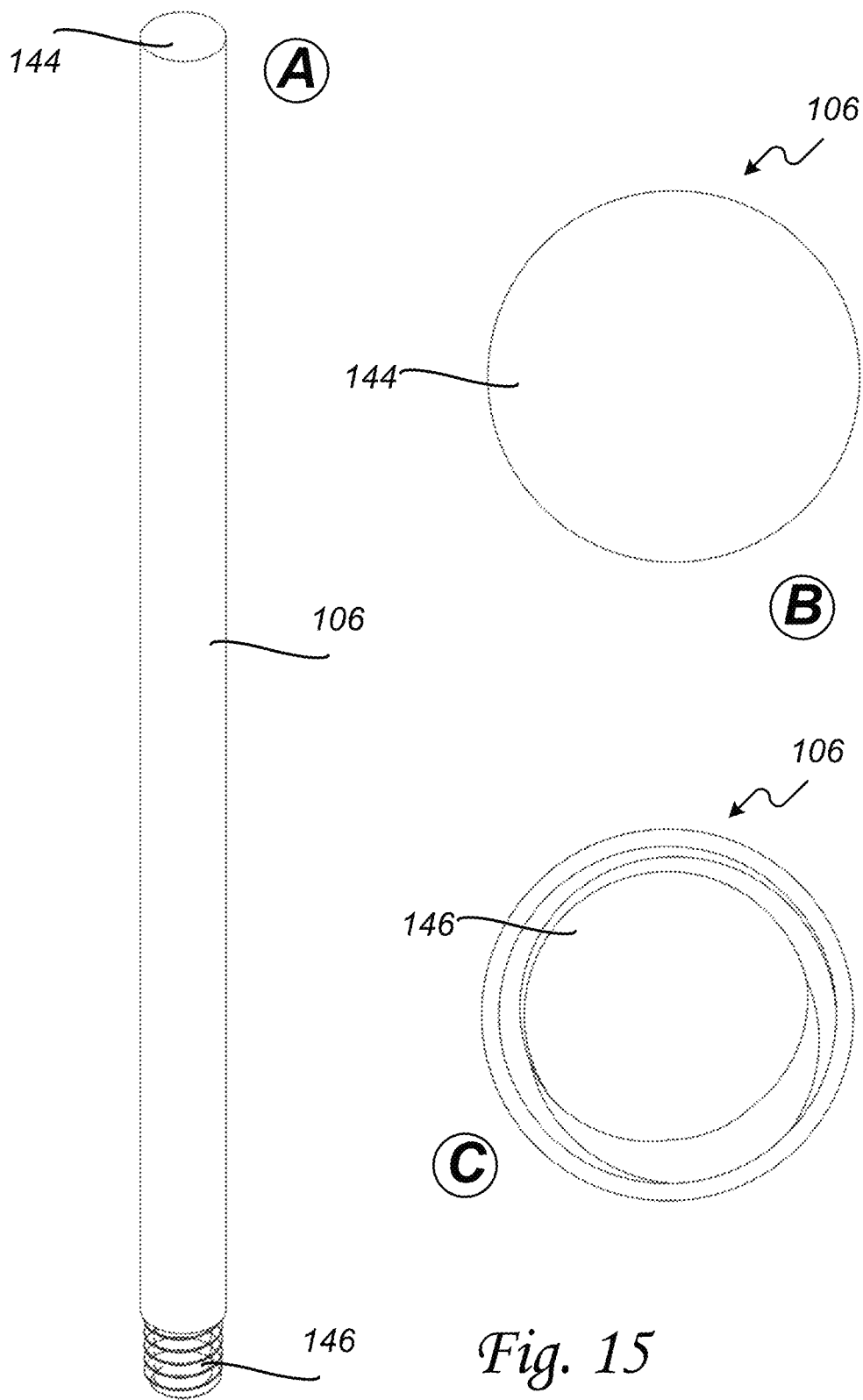
FIG. 15 illustrates one example of a rod attachment.

Referring to FIG. 15, there is illustrated one example of a rod 106 attachment, which is a critical component for supporting ornaments in an elevated position. In FIG. 15, reference 'A' shows a perspective view of rod 106, highlighting its overall length and the way it attaches to rod mount 114. In an exemplary embodiment, the rod 106 can come in various lengths, depending on the user's needs. Shorter rods may be used for smaller trees or lower profile ornaments, while longer rods are ideal for larger trees and ornaments that require greater visibility.

The free end 144 of rod 106, which is the portion extending away from the base 102, is designed to support the ornament, allowing it to be prominently displayed at the top of the tree. The free end 144 may also be configured to hold additional attachments, such as a cone 110 or hook 108, giving users flexibility in how they choose to display their ornaments. The perspective view in reference 'A' shows how rod 106 rises vertically from the tree topper, providing ample space for various ornament types and sizes.

FIG. 15, reference 'B' offers a top view of rod 106, illustrating its slim profile and its direct extension from rod mount 114. This top view helps to visualize how rod 106 maintains balance and stability when attached to base 102. The even, symmetrical design ensures that the ornament, once attached to the free end 144, remains upright and centered, contributing to the overall stability of the display.

FIG. 15, reference 'C' provides a bottom view of rod 106, focusing on the other end 146 of the rod, which is threaded or otherwise configured to interconnect with rod mount 114. In a preferred embodiment, the rod end 146 can be threaded, allowing it to securely screw into the rod mount 114 for a tight fit. This threaded connection ensures that rod 106 remains firmly attached to the stabilizer during use, even when supporting heavier ornaments. The bottom view clearly shows how the rod end 146 interfaces with the rod mount 114, ensuring a secure and stable connection.

The rod 106 may be available in a variety of lengths, giving users the flexibility to choose the appropriate height for their ornament display. For shorter trees or smaller ornaments, a shorter rod may be selected, while taller rods may be used for larger ornaments or trees. The different lengths allow for customizable displays, ensuring that ornaments are showcased in the most visually appealing manner, regardless of the size or shape of the tree.

In an exemplary embodiment, the rod 106 may be offered in multiple finishes or materials, such as polished metal, brass, or powder-coated finishes, to match the aesthetic preferences of different users. These options allow the tree topper stabilizer 100 to complement various decor styles, making it versatile for use in residential homes, commercial spaces, or public displays. Additionally, the free end 144 may feature a capped or decorative finish to enhance the visual appeal of the stabilizer when viewed from above.

The secure connection between rod end 146 and rod mount 114 is essential for ensuring the stability of the ornament during display. In the preferred embodiment, the threaded rod end 146 screws directly into the rod mount 114, providing a firm connection that prevents the rod from loosening or shifting over time. This is particularly important for larger or heavier ornaments, where a stable base is necessary to prevent tilting or movement.

In operation, FIG. 15 demonstrates how rod 106 can be adapted for various ornament types and tree sizes. Its adjustable length, secure connection to the rod mount 114, and customizable finishes make it an ideal solution for elevating ornaments in a wide range of display settings. Whether used in a home or a large commercial display, the rod 106 provides both stability and flexibility, ensuring that ornaments are prominently and securely displayed at the top of the tree.

Referring to FIG. 16, there is illustrated one example of a gripper leg 128, a gripper leg connector 118, and a large base 172. In an exemplary embodiment, the gripper leg 128 (reference 'A') features a gripper leg fastener 118 at one end, designed to securely interlock with the gripper leg connector 134. The gripper leg fastener 118 (reference 'B') includes a locking tab 170, which serves as the primary mechanism for securing the gripper leg 128 in place. During operation, the gripper leg 128 is slid along the axis indicated by reference 196 onto the gripper leg connector 134, which is equipped with a tab slot 198. As the gripper leg 128 is fully inserted, the locking tab 170 engages the tab slot 198 in a removable manner, providing a firm but flexible connection between the gripper leg 128 and the threaded tab 136.

This locking mechanism ensures that the gripper legs 128 remain securely attached during use, preventing any unintentional detachment due to the weight of the ornament or movement of the tree branches. The locking tab 170 and tab slot 198 connection allows for easy assembly and disassembly, giving users the flexibility to adjust or replace the gripper legs 128 depending on the specific needs of the ornament or tree. The design provides sufficient resistance to external forces while allowing the stabilizer to be easily removed or repositioned as needed, ensuring a balance of stability and convenience.

In another exemplary embodiment, the large base 172 (reference 'C') is designed to provide additional support and stability for larger ornaments or complex decorations. The large base 172 can be secured to the attachment adapter 112, providing a firm platform that reinforces the overall structure of the tree topper stabilizer 100. The large base 172 features a center hole 178, allowing the rod mount 114 and the rod mount housing 156 to protrude through the surface of the base, ensuring that the rod 106 remains easily accessible for mounting ornaments.

The large base 172 is specifically designed to handle heavier ornaments and prevent them from shifting or tilting during display. To achieve this, the base includes a raised outer perimeter edge 174, which helps to keep objects placed on the large base 172 from sliding off, especially if the tree is bumped or the branches move. This raised edge provides additional security for delicate or valuable decorations.

Furthermore, the large base 172 incorporates multiple slots 176 cut through its surface. These slots serve several practical purposes: they aid in securely mounting ornaments by allowing various attachment mechanisms, such as wires or hooks, to pass through; they also enable the routing of electrical wires for lighted ornaments, ensuring that the display remains tidy and free from visible cords. The slots may also provide enhanced airflow and reduced weight, making the base functional without adding unnecessary bulk. The thoughtful design of the large base 172 ensures that it can accommodate a wide variety of ornaments and accessories while maintaining a stable and secure setup.

Figure 17:
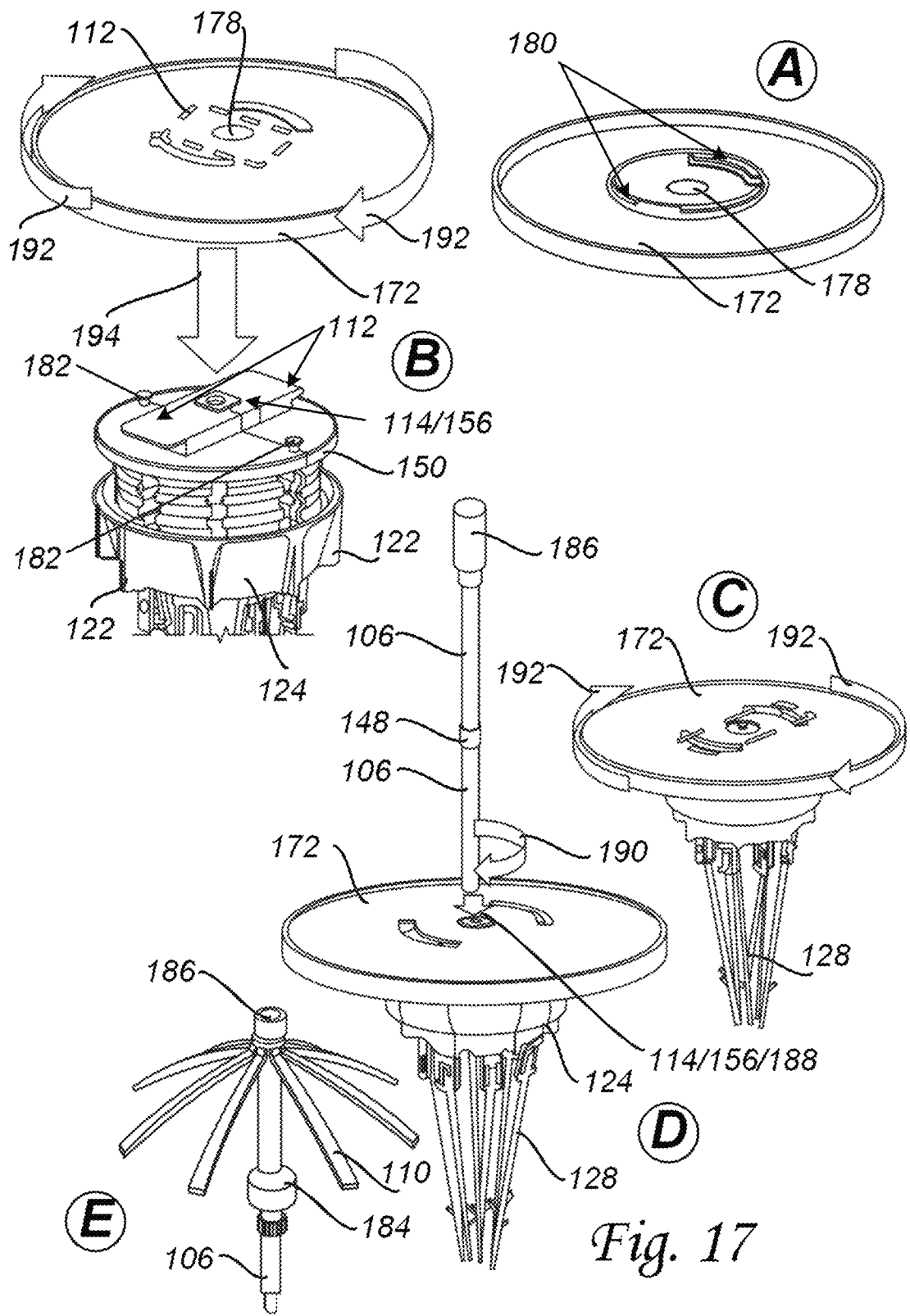
FIG. 17 illustrates one example of assembling the tree topper stabilizer using the large base.

Referring to FIG. 17, there is illustrated an example of assembling the tree topper stabilizer 100 using the large base 172. Reference 'A' shows a bottom view of the large base 172, highlighting the presence of locking tabs 180. These tabs play a crucial role in securing the base to the stabilizer. When the base is rotated during installation, the locking tabs 180 engage with the outer edges of the attachment adapter 112, effectively anchoring the base in position. This engagement occurs in a removable manner, allowing the base to be detached, if necessary, without compromising the stability of the system during use. Additionally, the mounting pegs 182 act as safeguards to prevent the base from over-rotating, ensuring that the base remains securely locked in place.

In an exemplary embodiment, as shown in reference 'B', the large base 172 can be placed onto the attachment adapter 112 by aligning the locking tabs 180 and then rotated along the axis indicated by reference 192 to lock the base into position. The rotation secures the base, while still allowing for easy removal if needed. The large base 172 offers a sturdy platform for supporting heavier ornaments or decorations that require additional stability. This locking mechanism ensures that the large base 172 remains firmly in place and properly aligned with the tree branches, preventing any shifting or tilting.

Once the large base 172 is securely mounted, reference 'C' illustrates the process of inserting rod 106 into rod mount 114. The rod is inserted into the mount and screwed into place as shown by reference 190. This attachment ensures that the rod is tightly fastened and capable of supporting an ornament. In some cases, users may prefer shorter rods, but if additional height is required, the rod 106 can be extended using a coupler 148, which seamlessly joins two rods to provide additional height for larger ornaments. To complete the assembly, an end cap 186 can be placed on the open end of rod 106, ensuring a polished appearance and preventing any sharp edges. If a rod 106 is not needed, the ornament can simply be placed directly on the large base 172 and secured as appropriate.

Reference 'D' shows a fully assembled stabilizer using the large base 172, with two rods 106 joined via a coupler 148 and capped with an end cap 186. This assembly highlights the flexibility of the tree topper stabilizer in supporting various ornament configurations, including those that require elevated positions or additional height to display larger or more prominent decorations.

Reference 'E' demonstrates the use of the cone 110 and a sliding mount 184. In an exemplary embodiment, the cone 110 can be positioned on rod 106, along with the sliding mount 184, which enables easy adjustment of the cone's height along the rod. The sliding mount 184 includes a fastener portion that can be tightened or loosened by the user. When the fastener portion is loosened, the sliding mount 184 can be repositioned along the rod 106. Once the desired height is set, the user tightens the fastener, causing the sliding mount 184 to frictionally grip the rod 106, locking the slide mount 184 in place and thus cone 110 that rests on the slidable mount 184 in place. This feature ensures that cone 110 remains at the desired height and prevents any unwanted movement during display.

In another exemplary embodiment, a screw cap 186 may be used to secure a cap on the top of the rod 106, preventing both the cone 110 and the ornament from becoming loose. This feature ensures that the ornament remains securely attached to the rod, even in high-traffic or outdoor environments where external factors like wind or accidental movement could otherwise dislodge the ornament. The combination of the adjustable sliding mount 184 and the screw cap 186 provides a versatile and secure system for displaying a wide range of ornaments, making the tree topper stabilizer 100 adaptable for various decorative needs.

Figure 18:
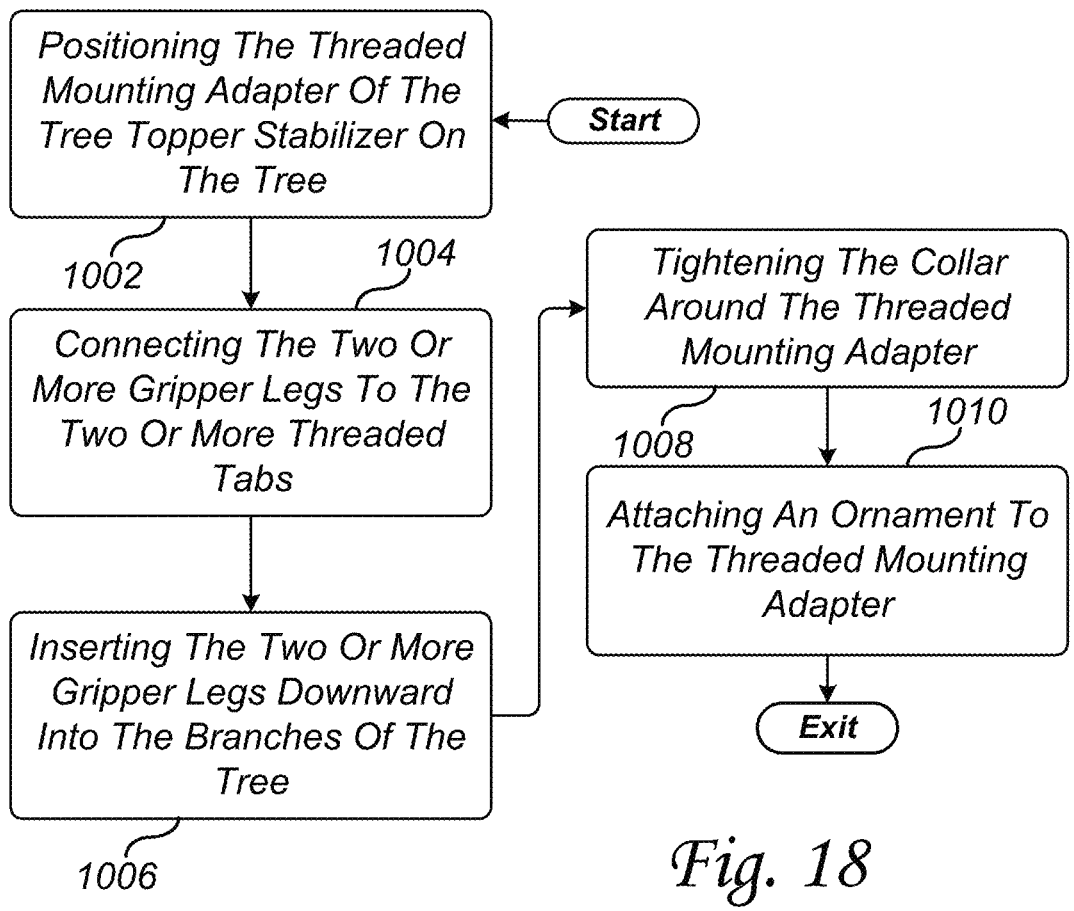
FIG. 18 illustrates one example of a method for securing an ornament to a tree using a tree topper stabilizer.

Referring to FIG. 18, there is illustrated one example of a method for securing an ornament to a tree 302 using a tree topper stabilizer 100, comprising a threaded mounting adapter with an attachment adapter, one or more rod mounts, two or more threaded tabs, two or more gripper legs, and a collar. In an exemplary embodiment, the method begins in step 1002.

In step 1002, the threaded mounting adapter 150 of the tree topper stabilizer 100 is positioned on the top or other suitable position of the tree 302. This step involves selecting an appropriate location on tree 302 where the stabilizer can be securely mounted. The user ensures that the branches are spaced and shaped in a way that allows the threaded mounting adapter 150 to sit comfortably and centrally. Proper positioning is crucial as it ensures the stability of the entire ornament display. The base 102 which interconnects with the threaded mounting adapter 150 may also be aligned with the tree's central trunk for additional support, ensuring that the weight of the ornament is distributed evenly.

In step 1004, the user connects the two or more gripper legs 128 to the two or more threaded tabs 136. The gripper legs 128 are interlocked with the corresponding gripper leg connectors 134 located at the ends of the threaded tabs 136. This connection is designed to be secure and provide a reliable grip on the tree. The interlocking mechanism ensures that the gripper legs 128 remain in place during the display, preventing any potential movement or slipping as the ornament is later attached. This step also ensures that the gripper legs 128 are properly aligned with the tree's branches for a firm grip.

In step 1006, the user inserts two or more gripper legs 128 downward into the branches of tree 302. The gripper legs 128 are designed to extend downward through the tree's upper branches, ensuring that they engage with the branches securely. The spikes 130 along the length of the gripper legs 128 intermingle with the branches, providing additional stability and preventing slippage. By inserting the gripper legs 302 through multiple layers of branches, the stabilizer ensures that the weight of the ornament is evenly distributed, which reduces the risk of tilting or instability, especially for heavier or larger ornaments.

In step 1008, the user tightens the collar 124 around the threaded mounting adapter 150. The collar 124, which is threaded on its interior surface, screws onto the threaded tabs 136, causing the tabs to flex inward. As the threaded tabs 136 are tightened, they press the gripper legs 128 firmly against the branches of the tree, thereby stabilizing the tree topper stabilizer 100. This tightening mechanism ensures that the gripper legs maintain a firm hold on the tree, preventing any unwanted movement or slippage. The gripping prongs 126 on the exterior of the collar can assist in tightening the collar by providing the user with additional leverage.

Finally, in step 1010, the user attaches an ornament to the threaded mounting adapter 150 by way of the attachment adapter 112 or the rod mount 114 using at least one of a rod 106, a hook 108, or a cone 110 attachment. Depending on the type of ornament, the user may choose to use a specific attachment for optimal display. For example, rod 106 can be used to elevate the ornament, while cone 110 can be used to securely support hollow ornaments. Once the ornament is connected to the stabilizer, it is held in an upright and balanced position at the top of the tree. This ensures that the ornament remains prominently displayed, stable, and secure throughout its use.

Figure 19:
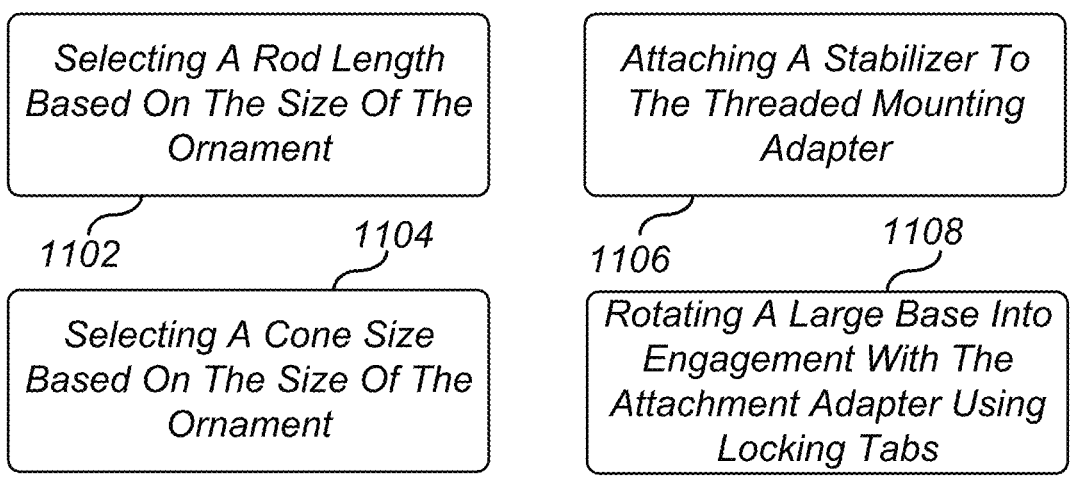
FIG. 19 illustrates exemplary embodiments that can be used interchangeably with the method of the present invention.

Referring to FIG. 19, there are illustrated exemplary embodiments that can be used interchangeably with the methods of the present invention.

In step 1102, the method further comprises selecting an appropriate rod length 106 based on the size and weight of the ornament being secured. This step ensures that the ornament is displayed at the optimal height and maintains proper balance on the tree. For smaller or lighter ornaments, a shorter rod may be selected to prevent the ornament from overpowering the visual arrangement or appearing too high relative to the tree's other decorations. Conversely, for larger or heavier ornaments, a longer or reinforced rod may be chosen to provide sufficient elevation and structural support. The rod length 106 is selected to complement the ornament's size, ensuring that the ornament remains stable and securely fastened while prominently displayed at the top of the tree. This adaptability allows the stabilizer to accommodate a wide range of ornament sizes and enhances the versatility of the overall display.

In step 1104, the method further comprises selecting an appropriate cone size 110 based on the size and shape of the ornament being secured. This step ensures that the ornament is supported securely and balanced effectively, particularly for ornaments with hollow or irregular bases. Smaller cones may be selected for lighter or more compact ornaments, allowing the cone tabs 142 to fit snugly and provide a stable base. For larger or heavier ornaments, a bigger or more flexible cone 110 may be chosen to offer broader support and ensure that the ornament does not tilt or shift during display. The size of the cone 110 is selected to match the ornament's base, ensuring that it is cradled securely while remaining upright and prominently positioned on the tree. This flexibility enhances the versatility of the stabilizer, allowing it to accommodate a wide range of ornament shapes and sizes.

In step 1106, the method further comprises attaching a stabilizer 116 to the threaded mounting adapter 150, wherein the stabilizer is semicircle in shape and includes a semicircle collar 158 that is positioned near one or more rod mounts 114. This step provides additional support and stability to the rod 106 or any other ornament attachment, ensuring that the ornament remains secure and balanced during display. The semicircle collar 158 applies a stabilizing force to the rod 106, preventing it from wobbling or shifting under the weight of the ornament. The stabilizer's placement near the rod mounts 114 reinforces the connection between the rod and the mounting adapter, providing extra rigidity and ensuring the ornament remains upright, even when exposed to external factors such as movement or wind. This added structural support enhances the overall stability of the ornament display, making the stabilizer suitable for larger or heavier ornaments.

In step 1108, the method involves rotating the large base 172 into engagement with the attachment adapter 112 using locking tabs 180. As the base is rotated, the locking tabs 180 slide under the edges of the attachment adapter 112, securely locking the large base into position. Additionally, the locking pegs 182 prevent the base from over-rotating, ensuring it remains correctly aligned and secured. This combination of locking tabs 180 and locking pegs 182 provides a firm attachment, preventing any unintended rotation or movement of the base. Once engaged, the large base 172 offers a stable platform capable of supporting larger or heavier ornaments, enhancing the overall stability of the tree topper stabilizer. This step ensures that the tree topper stabilizer 100 remains securely fastened to the tree, supporting a wide range of ornament types and weights with confidence.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A tree topper stabilizer for securing an ornament to a tree, comprising:
    a threaded mounting adapter comprising an attachment adapter, one or more rod mounts, and at least two threaded tabs, each of the at least two threaded tabs is configured with a gripper leg connector;
    at least two gripper legs, each of the at least two gripper legs is configured to interlock with at least one of the gripper leg connector; and
    a collar comprising internal threading that engages and tightens around the at least two threaded tabs, causing the at least two threaded tabs to flex inward, squeezing and securing the at least two gripper legs against one or more branches of the tree, thereby stabilizing the tree topper stabilizer;
    wherein the tree topper stabilizer is configured to secure various types and sizes of ornaments to the tree by way of the attachment adapter.

2. The tree topper stabilizer of claim 1, further comprising a base that is configured with a mounting adapter hole, wherein the threaded mounting adapter extends through the mounting adapter hole and the base fastens to the threaded mounting adapter.

3. The tree topper stabilizer of claim 2, further comprising a stabilizer that is secured to the base, the stabilizer selectively covering at least a portion of the attachment adapter.

4. The tree topper stabilizer of claim 2, wherein the attachment adapter is adjustable, enabling different ornament orientations or positions relative to the base.

5. The tree topper stabilizer of claim 2, further comprising a rod that is removably fastened to the one or more rod mounts, the rod extending upward from the base.

6. The tree topper stabilizer of claim 5, further comprising a cone that is attached to the rod, the cone comprising a plurality of cone tabs that together form a cone shape, wherein an ornament can be placed over the cone.

7. The tree topper stabilizer of claim 2, further comprising:
   a rod interconnected with one of the one or more rod mounts and extending upward from the base;
   a cone fastened to the rod, wherein the cone comprises one or more flexible cone tabs;
   wherein the one or more cone tabs are configured to flex outward or inward depending on the size and type of the ornament being secured.

8. The tree topper stabilizer of claim 7, further comprising a sliding mount that is adjustably positioned along the rod, the sliding mount configured to frictionally grip the rod, allowing the cone to be positioned at varying heights to accommodate different ornament sizes.

9. The tree topper stabilizer of claim 7, wherein the attachment adapter is adjustable, enabling different ornament orientations or positions relative to the base.

10. The tree topper stabilizer of claim 7, wherein the collar comprises gripping prongs along an exterior surface of the collar to aid in tightening the collar around the threaded tabs.

11. The tree topper stabilizer of claim 7, further comprising a stabilizer that is secured to the threaded mounting adapter.

12. The tree topper stabilizer of claim 1, wherein the collar comprises gripping prongs on its exterior surface to aid in tightening the collar around the threaded tabs.

13. The tree topper stabilizer of claim 1, further comprising a large base configured to engage with the attachment adapter, wherein the large base is rotatably secured using locking tabs.

14. The tree topper stabilizer of claim 1, wherein each of the at least two gripper legs comprise one or more spikes along their length to improve stability by interlocking with the one or more branches of the tree.

15. The tree topper stabilizer of claim 1, wherein the attachment adapter is configured to interconnect with different types of mounting platforms, attachments, or ornaments in a slide-and-lock manner.

16. A method of using the tree topper stabilizer of claim 1, the method comprising the steps of:
    positioning the threaded mounting adapter of the tree topper stabilizer on the tree;
    connecting the at least two gripper legs to the at least two threaded tabs;
    inserting the at least two gripper legs downward into the one or more branches of the tree;
    tightening the collar around the threaded mounting adapter, causing the at least two threaded tabs to flex inward, pressing the at least two gripper legs against the one or more branches of the tree, thereby stabilizing the tree topper stabilizer; and
    attaching an ornament to the threaded mounting adapter by way of the attachment adapter, wherein the tree topper stabilizer holds the ornament in an upright and balanced position on the tree.

17. The method of claim 16, further comprising the step of:
    rotating a large base into engagement with the attachment adapter using locking tabs, thereby securing, by way of tree topper stabilizer, the large base to the tree.

18. The method of claim 16, further comprising the step of:
    selecting a rod length based on the size of the ornament being secured.

19. The method of claim 16, further comprising the step of:
    selecting size of a cone based on ornament size being secured.

20. The method of claim 16, further comprising the step of:
    attaching a stabilizer to the threaded mounting adapter, wherein the stabilizer is semicircle in shape and comprises a semicircle collar that is proximate to the one or more rod mounts.

\* \* \* \* \*